(12) United States Patent
Lebens et al.

(10) Patent No.: US 12,316,142 B2
(45) Date of Patent: May 27, 2025

(54) WIRELESS POWER TRANSMITTER AND METHOD OF OPERATION THEREFOR

(71) Applicant: KONINKLIJKE PHILIPS N.V., Eindhoven (NL)

(72) Inventors: Pascal Leonard Maria Theodoor Lebens, Eindhoven (NL); Wilhelmus Gerardus Maria Ettes, Leeuwarden (NL); Klaas Jakob Lulofs, Veldhoven (NL); Johannes Wilhelmus Draak, Limburg (NL)

(73) Assignee: ]Koninklije Philips N.V., Eindhoven (NL)

( * ) Notice: Subject to any disclaimer, the term of this patent is extended or adjusted under 35 U.S.C. 154(b) by 0 days.

(21) Appl. No.: 18/266,305

(22) PCT Filed: Dec. 10, 2021

(86) PCT No.: PCT/EP2021/085136
§ 371 (c)(1),
(2) Date: Jun. 9, 2023

(87) PCT Pub. No.: WO2022/128762
PCT Pub. Date: Jun. 23, 2022

(65) Prior Publication Data
US 2024/0048002 A1 Feb. 8, 2024

(30) Foreign Application Priority Data
Dec. 18, 2020 (EP) .................................... 20215742

(51) Int. Cl.
*H02J 50/90* (2016.01)
*H02J 50/12* (2016.01)

(52) U.S. Cl.
CPC .............. *H02J 50/90* (2016.02); *H02J 50/12* (2016.02)

(58) Field of Classification Search
CPC . H02J 50/90; H02J 50/12; H02J 50/60; H04B 5/263; H04B 5/73; H04B 5/79
See application file for complete search history.

(56) References Cited

U.S. PATENT DOCUMENTS

| 10,330,743 B2 | 6/2019 | Komiyama |
| 11,038,381 B2 | 6/2021 | Van Wageningen et al. |
| (Continued) | | |

FOREIGN PATENT DOCUMENTS

| JP | 2012249400 A | 12/2012 |
| WO | 2017194338 A1 | 11/2017 |
| WO | 2020007640 A1 | 1/2020 |

OTHER PUBLICATIONS

International Search Report and Written Opinion from PCT/EP2021/085136 mailed Mar. 30, 2022.
QI Specification Jan. 2021.

*Primary Examiner* — Lincoln D Donovan
*Assistant Examiner* — Alex W Lam

(57) ABSTRACT

A power transmitter (101) comprises a driver (201) generating a drive signal for a transmitter coil to generate a power transfer signal during a power transfer time interval and an electromagnetic test signal during a measurement time interval. A set of balanced detection coils (207, 209) comprise two detection coils arranged such that signals induced in the two detection coils by an electromagnetic field generated by the transmitter coil compensate each other. An estimation circuit (205) determines a position/coupling factor estimate for the power receiver (105) in response to signals from the plurality of sets of balanced detection coils (207, 209) during the at least one measurement time interval.

22 Claims, 14 Drawing Sheets

(56) References Cited

U.S. PATENT DOCUMENTS

| | | |
|---|---|---|
| 11,303,152 B2 | 4/2022 | Ettes et al. |
| 11,476,720 B2 | 10/2022 | Ettes et al. |
| 2013/0176023 A1* | 7/2013 | Komiyama .......... G01R 33/028 |
| | | 324/258 |
| 2014/0111019 A1 | 4/2014 | Roy et al. |
| 2014/0145514 A1 | 5/2014 | Konno et al. |
| 2015/0155095 A1 | 6/2015 | Wu et al. |
| 2016/0006260 A1 | 1/2016 | Nakamura et al. |
| 2020/0083754 A1 | 3/2020 | Tian et al. |
| 2020/0280220 A1 | 9/2020 | Ettes et al. |
| 2020/0313470 A1* | 10/2020 | Uchimoto ............... H02J 50/80 |
| 2021/0138917 A1* | 5/2021 | Kanakasabai ......... B60L 53/124 |

* cited by examiner

WIRELESS POWER TRANSMITTER AND METHOD OF OPERATION THEREFOR

CROSS-REFERENCE TO PRIOR APPLICATIONS

This application is the U.S. National Phase application under 35 U.S.C. § 371 of International Application No. PCT/EP2021/085136, filed on Dec. 10, 2021, which claims the benefit of EP Patent Application No. EP 20215742.6, filed on Dec. 18, 2020. These applications are hereby incorporated by reference herein.

FIELD OF THE INVENTION

The invention relates to a wireless power transfer system and in particular, but not exclusively, to the operation of a power transmitter providing inductive power transfer to high power devices, such as e.g. kitchen appliances.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being further developed. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

The Wireless Power Consortium has on the basis of the Qi Specification proceeded to develop the Ki Specification (also known as the Cordless Kitchen Specification) which is aimed at providing safe, reliable, and efficient wireless power transfer to kitchen appliances. Ki supports much higher power levels up to 2.2 KW.

A potential problem with wireless power transfer is that the power transfer performance may depend significantly on the specific conditions. In particular, the power transfer performance in terms of efficiency, achievable power levels, adaptation response times, etc., tend to depend heavily on how the transmitter coil and the receiver coil are positioned relatively to each other. In general, more efficient and reliable power transfer tends to be achieved for the coils aligning and being closer to each other.

Typically, the power transfer performance depends on the coupling factor or coefficient and the higher the coupling factor the more efficient the power transfer.

Although closer alignment and higher coupling factors can be achieved by designing the devices such that the positioning of the power receiver device relative to the power transmitter device is severely constrained, e.g. restricting the power receiver to one specific position, this is generally undesirable as it restricts the practicality of the system. For example, for kitchen appliances where the power transmitter is implemented in a worktop, it is preferable that the user can simply position the appliance approximately near to a power transmitter coil with the system then adapting accordingly. It is also preferable for the power transfer function to be implemented without requiring e.g. mechanical or physical guide features constraining the power receiver device, e.g. it is desired that the power transmitter can be implemented using a completely flat worktop surface.

In practice, the spatial relationship, and with this the coupling factor, between the power transmitter and the power receiver can vary substantially. In many scenarios, it would be desirable to be able to determine such varying properties and adapt e.g. the power transfer or provide user feedback. It would in particular be desirable to be able to determine the relative position of the power receiver and/or the coupling factor between the coils.

Some approaches for achieving this have been proposed. One such approach is to include a plurality of transmitter coils over the active surface and then for the power transmitter to sequentially switch between the transmitter coils until it has been determined which of the transmitter coils provide the best power transfer. This transmitter coil is then used for the power transfer.

However, such approaches tend to be suboptimal and not provide ideal performance. The position determination of the power receiver tends to be very coarse and the adaptation of the power transfer operation also tends to be limited.

Hence, an improved operation for a power transmitter would be advantageous and, in particular, an approach allowing increased flexibility, reduced cost, reduced complexity, improved power receiver position and/or coupling factor estimation, backwards compatibility, improved suitability for higher power level transfers, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver via an inductive power transfer signal; the power transmitter comprising: a transmitter coil; a driver for generating a drive signal for the transmitter coil, the driver being arranged to generate the drive signal for the transmitter coil to generate the power transfer signal during at least one power transfer time interval of a repeating time frame and to generate the drive signal for the transmitter coil to generate an electromagnetic test signal during at least one measurement time interval of the repeating time frame; a plurality of sets of balanced detection coils coupled in series, each set of balanced detection coils comprising two detection coils arranged such that signals induced in the two detection coils by an electromagnetic field generated by the transmitter coil compensate each other; an estimation circuit for determining a coupling factor estimate for an electromagnetic coupling between the transmitter coil and a receiver coil of the power receiver in response to signals from the plurality of sets of balanced detection coils during the at least one measurement time interval.

The invention may provide improved estimation of a coupling factor for the electromagnetic coupling between the transmitter coil and the receiver coil of the power receiver in many embodiments and scenarios. The invention may allow improved power transfer in many embodiments and may in particular provide improved adaptation of the power transfer to changing operating conditions.

The measurement time interval of the repeating time frame may specifically be timed to coincide with/include, be synchronized with zero crossings of the amplitude of the power transfer signal and/or of a varying (e.g. AC) supply voltage to the output stages of the driver.

The coupling factor estimate may be a coupling factor change estimate.

In many embodiments, a duration of the measurement time interval is no more than 5%, 10%, or 20% of the duration of the time frame. In many embodiments, the duration of the measurement time interval(s) is no less than 70%, 80%, or 90% of the time frame. A duration of the measurement time interval(s) may in many scenarios not exceed 5 msec, 10 msec, or 50 msec.

The detection coils are balanced in that the detection coils are arranged such that signals induced in the two detection coils by an electromagnetic field generated by the transmitter coil compensate each other. The combined voltage over the two balanced detection coils is lower than the largest of the voltages over each of the two balanced detection coils. The compensation may be an at least partial cancellation of the two signals.

The electromagnetic test signal may also be referred to as a test electromagnetic field and the terms may be considered interchangeable. The detection coils/for as set of balanced detection coils may be coupled in series. For detection coils/winding being coupled in series the current through the detection coils/winding may be identical. The signals from the plurality of sets of balanced detection coils during the at least one measurement time interval may be signals induced by/resulting from/caused by the electromagnetic test signal.

In some embodiments, a frequency of the drive signal during the measurement time interval is no lower than 50% higher than a frequency of the drive signal during power transfer time interval.

This may provide improved and/or facilitated measurement/determination of signals indicative of imbalance for the detection coils in many embodiments. It may in particular provide reduced impact of the loading by a load of the power receiver. The reduced impact of the load may result in more accurate position estimation in many embodiments.

In some embodiments the frequency of the drive signal during the measurement time interval is no less than 100%, or even 200% higher than a frequency of the drive signal during power transfer time interval.

In some embodiments, a voltage amplitude of the drive signal during the measurement time interval is no higher than 50% of a voltage amplitude of the drive signal during power transfer time intervals.

In some embodiments, the voltage amplitude of the drive signal during the measurement time interval is no higher than 25% or 10% of a voltage amplitude of the drive signal during power transfer time intervals.

In some embodiments, a voltage amplitude of the drive signal is substantially constant during the measurement time interval.

This may provide improved and/or facilitated power receiver position estimation in many embodiments.

Each set of balanced detection coils may comprise two detection coils arranged such that signals induced in the two detection coils by an electromagnetic field, and specifically generated by the transmitter coil, offset/compensate/at least partially cancel each other in the signal from the set of balanced detection coils.

A signal from a set of balanced detection coils may specifically be a combined signal of the induced signals from the detection coils of the set of detection coils. The signal may be a combined/summed voltage (or include such a voltage contribution) of the voltages induced in each of the detection coils. The imbalance between signals induced in the two detection coils for a given set of detection coils may be indicated by a voltage, and specifically a voltage amplitude, and/or phase, of the signal.

The estimation circuit is arranged to determine a coupling factor estimate for an electromagnetic coupling between the transmitter coil and a receiver coil of the power receiver in response to signals from the plurality of sets of balanced detection coils during the at least one measurement time interval.

This may in particular provide improved operation of the power transfer and may allow adaptation of the power transfer to changing conditions.

In accordance with an optional feature of the invention, the coupling factor estimate is a relative coupling factor estimate.

This may provide particularly advantageous performance in many embodiments and scenarios. The relative coupling factor estimate may be indicative of changes in the coupling factor.

In accordance with an optional feature of the invention, the estimation circuit is arranged to determine the coupling factor estimate as a decreasing coupling factor for an increasing amplitude of a at least a first of the sets of balanced detection coils.

This may provide particularly advantageous performance in many embodiments and scenarios.

In accordance with an optional feature of the invention, the estimation circuit is arranged to determine the coupling factor estimate as a decreasing coupling factor for an increasing amplitude difference between at least two of the sets of balanced detection coils.

This may provide particularly advantageous performance in many embodiments and scenarios.

In accordance with an optional feature of the invention, the power transmitter comprises an adapter arranged to adapt a power loop parameter in response to the coupling factor estimate, the power loop parameter being a loop parameter of a power control loop arranged to adapt a power level of the power transfer signal in response to power control messages received from the power receiver.

This may provide particularly advantageous performance in many embodiments and scenarios. It may provide improved power transfer and may allow improved adaptation of the operation to changing conditions.

In accordance with an optional feature of the invention, the power loop parameter is at least one of a loop time constant, a frequency response of a loop filter, and a loop gain.

This may provide particularly advantageous performance in many embodiments and scenarios, and may in particular in many embodiments provide improved and/or facilitated adaptation of the power transfer operation.

In accordance with an optional feature of the invention, the estimation circuit is arranged to determine a position estimate for the power receiver in response to signals from the plurality of sets of balanced detection coils during the at least one measurement time interval.

The approach may provide improved estimation of a position of a power receiver of a wireless power transfer in many embodiments and scenarios. The invention may allow improved power transfer in many embodiments and may in particular provide improved adaptation of the power transfer to changing operating conditions.

In accordance with an optional feature of the invention, the power transmitter further comprises a user interface arranged to provide a user output providing an indication of misalignment of the power receiver in response to the position estimate meeting a requirement.

This may provide improved and/or facilitated operation in many embodiments. It may allow a user to prevent undesirable situations where efficient power transfer is not feasible.

The requirement may specifically include a requirement that a difference/distance between the position estimate and a nominal or preferred position exceeds a threshold.

The indication may include an indication of a direction of movement of the power receiver for reducing the misalignment.

In some embodiments, the power transmitter may comprise a user interface arranged to provide a user output providing an indication of a position of the power receiver in response to the position estimate.

In some embodiments, the power transmitter may comprise a communicator for communicating an indication of the position estimate to the power receiver. The power receiver may comprise a user interface arranged to provide a user output providing an indication of a position of the power receiver in response to the position estimate.

In accordance with an optional feature of the invention, the power transmitter further comprises an adapter arranged to adapt an operational parameter of the power transfer in response to the position estimate.

This may provide particularly advantageous performance in many embodiments, and may in particular in many embodiments and scenarios provide improved power receiver position estimation, and/or improved power transfer.

This may provide particularly advantageous performance in many embodiments and scenarios. The operating parameter may for example be a maximum power limit for the power transfer signal, and/or a current power level for the power transfer signal.

In some embodiments, the adapter is arranged to adapt a power loop parameter in response to changes the position estimate, the power loop parameter being a loop parameter of a power control loop arranged to adapt a power level of the power transfer signal in response to power control messages received from the power receiver.

In accordance with an optional feature of the invention, the adapter is arranged to adapt a power loop parameter in response to the position estimate, the power loop parameter being a loop parameter of a power control loop arranged to adapt a power level of the power transfer signal in response to power control messages received from the power receiver.

This may provide particularly advantageous performance in many embodiments. It may provide improved power transfer and may allow improved adaptation of the operation to changing conditions.

In accordance with an optional feature of the invention, the position circuit is arranged to detect a position change for the power receiver if the signals meet a criterion including a requirement that a number of signals from the set of balanced detection coils indicating an imbalance between the signals induced in the two detection coils of the set of balanced detection coils exceeding a second threshold is less than a threshold number, the threshold number being at least two.

This may provide particularly advantageous performance in many embodiments and scenarios, and may in particular in many embodiments provide improved position estimate. It may allow improved adaptation to the current conditions and operating scenario. In many embodiments, the threshold number may be at least three, and in many embodiments the threshold number may be equal to the number of sets of balanced detection coils.

In accordance with an optional feature of the invention, the power transmitter further comprises a compensator arranged to compensate the signal for at least one set of balanced detection coils for an imbalance between the signals induced in the two detection coils when no foreign object is present, and the estimator is arranged to determine the position estimate in response to an amount of compensation for the at least one set of balanced detection coils.

This may provide particularly advantageous performance in many embodiments and scenarios, and may in particular in many embodiments provide improved position estimate. It may in particular facilitate position estimation, and may facilitate determination of indications of imbalance.

In many embodiments, the power transmitter may comprise a foreign object detector coupled to plurality of sets of balanced detection coils and arranged to perform foreign object detection during the measurement time interval, the foreign object detector being arranged to detect a foreign object in response to signals from the plurality of sets of balanced detection coils meeting a foreign object detection criterion. The signals may be the signals from the plurality of sets of balanced detection coils following compensation.

The foreign object detection criterion may include a first requirement that a signal from at least one of the plurality of sets of balanced detection coils indicates an imbalance between signals induced in the two detection coils of the at least one of the plurality of sets of balanced detection coils exceeding a first threshold.

The foreign object detection criterion may include a second requirement that a number of signals from the plurality of sets of balanced detection coils indicating an imbalance between signals induced in the two detection coils of the set of balanced detection coils exceeding a second threshold is less than a threshold number, the threshold number being at least two.

In accordance with an optional feature of the invention, the compensator is arranged to determine a static component and a dynamic component of the compensation, the static component being independent of a presence of the power receiver and the dynamic component being dependent on the presence of the power receiver; and the estimator is arranged to determine the position estimate in response to the dynamic component.

In accordance with another aspect of the invention, there is provided a method of operation for a power transmitter wirelessly providing power to a power receiver via an inductive power transfer signal; the method comprising: a transmitter coil; a plurality of sets of balanced detection coils coupled in series, each set of balanced detection coils comprising two detection coils arranged such that signals induced in the two detection coils by an electromagnetic field generated by the transmitter coil compensate each other; and the method comprising: a driver generating a drive signal for the transmitter coil, the driver generating the drive signal for the transmitter coil to generate the power transfer signal during at least one power transfer time interval of a repeating time frame and generating the drive signal for the transmitter coil to generate an electromagnetic test signal during at least one measurement time interval of the repeating time frame; and determining a position estimate for the power receiver in response to signals from the plurality of sets of balanced detection coils during the at least one measurement time interval.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Qi specification or the Ki Specification. However, it will be appreciated that the invention is not limited to this application but may be applied to many other wireless power transfer systems.

Figure 1:
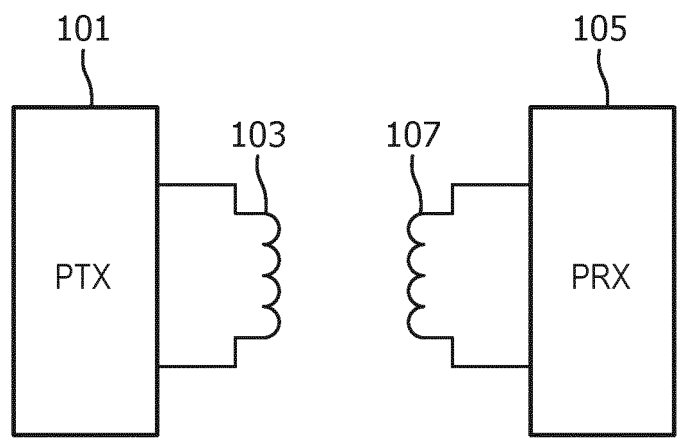
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may typically have a frequency between around 20 kHz to around 500 kHz, and often for Qi compatible systems typically in the range from 95 kHz to 205 kHz or for Ki compatible systems typically in the range between 20 kHz to 80 kHz. The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 2000 W for very high power applications, such as e.g. for Ki kitchen applications.

In the following, the operation of the power transmitter 101 and the power receiver 105 will be described with specific reference to an embodiment generally in accordance with the Qi or Ki Specifications (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

In many wireless power transfer systems, the power transfer operating conditions may change dynamically e.g. as a function of the spatial arrangement of the transmitter coil 103 and the receiver coil 107. In many systems, it would be desirable to be able to measure properties of the electromagnetic conditions and proceed to adapt the operation accordingly.

As will be described in more detail in the following, the system of FIG. 2 employs a measurement approach that utilizes time division during the power transfer phase. In particular, measurements of the current conditions and power transfer may e.g. be performed in separate time intervals thereby allowing the interference between these (specifically the impact of the power transfer on the measurements and associated estimation of operating parameters) to be reduced substantially.

In the following, the system of FIG. 1 will be described in more detail. In the example, the electromagnetic power transfer signal and the electromagnetic test signal used for the measurements are generated by the same coil. Further, the signals/fields may be referred to by different terms, namely the electromagnetic signal/field generated during power transfer time intervals will be referred to as the power transfer signal and the electromagnetic signal/field generated during measurement time intervals will be referred to as the electromagnetic test signal, or just the test signal.

Figure 2:
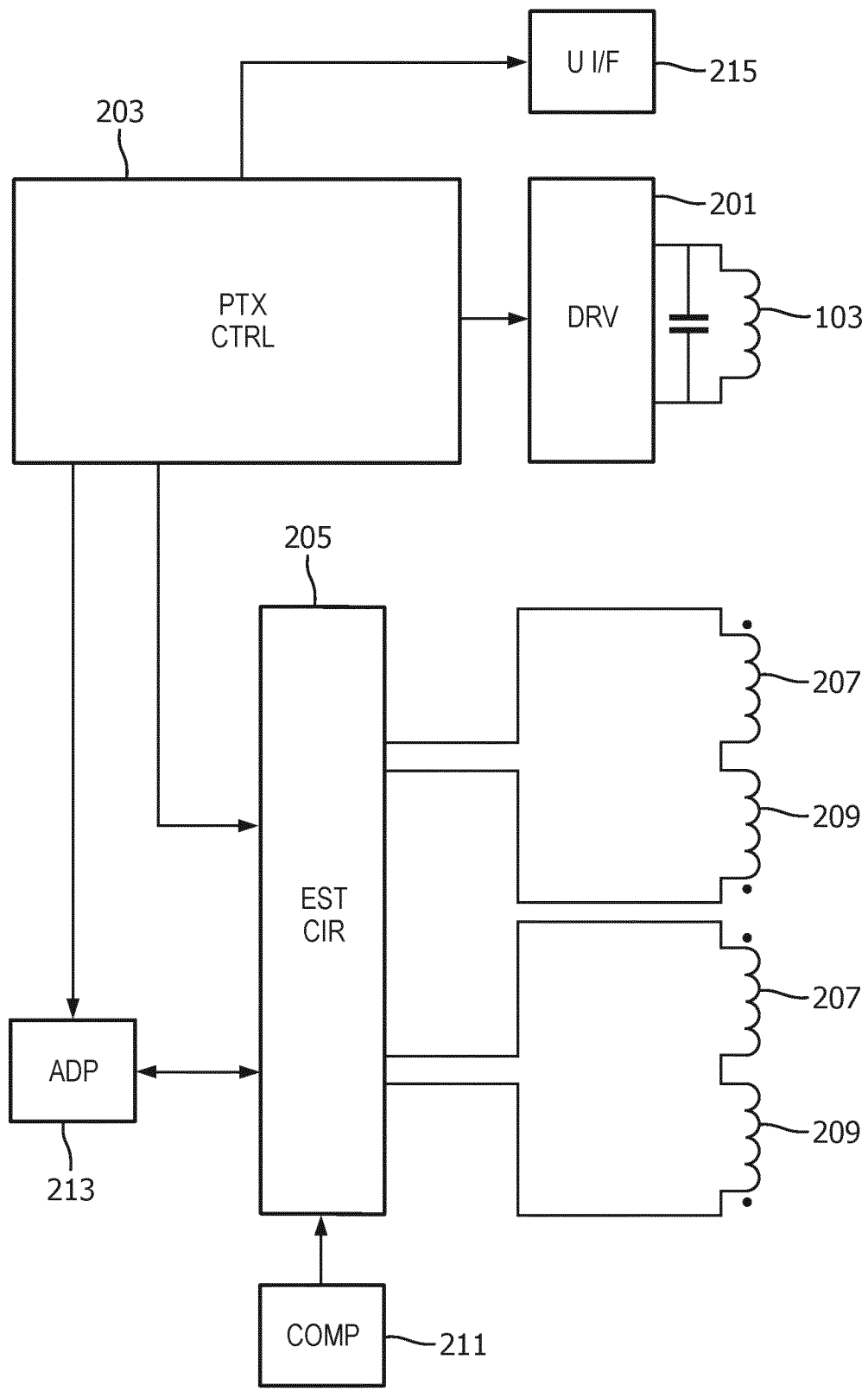
FIG. 2 illustrates an example of elements of a power transmitter in accordance with some embodiments of the invention.

FIG. 2 illustrates elements of the power transmitter 101 of FIG. 1 in more detail.

The power transmitter 101 includes a driver 201 which can generate a drive signal that is fed to the transmitter coil 103 which in return generates the electromagnetic power transfer signal thereby providing a power transfer to the power receiver 105. The power transfer signal is provided during power transfer time intervals of the power transfer phase.

Figure 3:
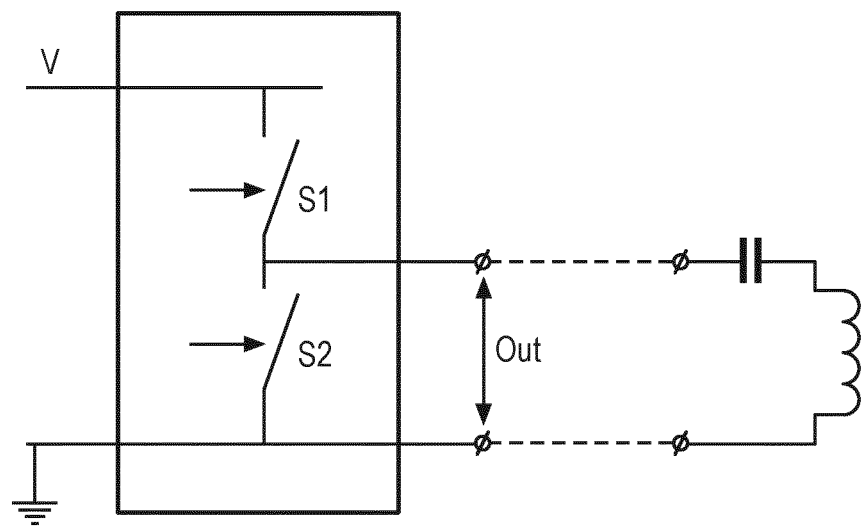
FIG. 3 illustrates an example of a half bridge inverter for a power transmitter.
Figure 4:
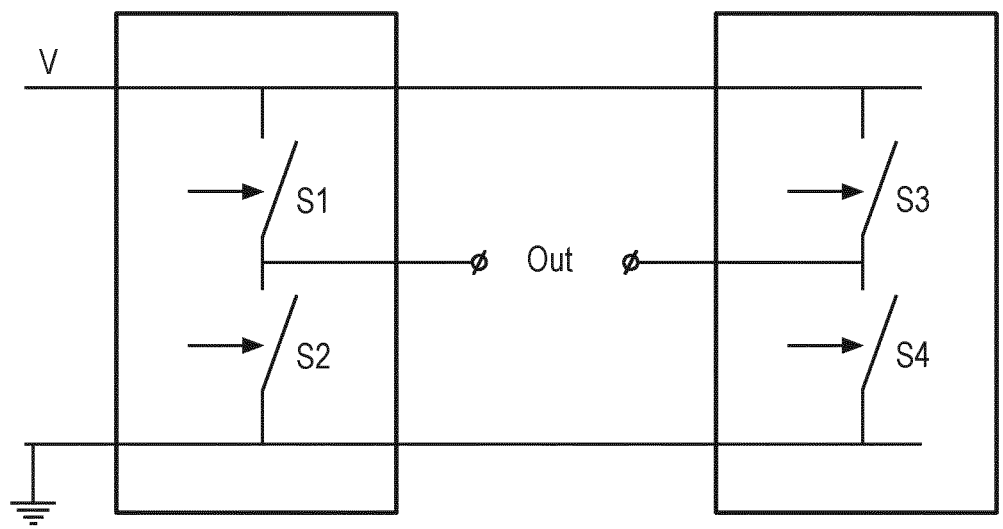
FIG. 4 illustrates an example of a full bridge inverter for a power transmitter.

The driver 201 generates the current and voltage which is fed to the transmitter inductor 103. The driver 201 is typically a drive circuit in the form of an inverter which generates an alternating signal from a DC Voltage. The output of the driver 201 is typically a switch bridge generating the drive signal by the appropriate switching of switches of the switch bridge. FIG. 3 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 4 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are opened and closed with the desired frequency.

The power transmitter 101 further comprises a power transmitter controller 203 which is arranged to control the operation of the power transmitter 101 in accordance with the desired operating principles. Specifically, the power transmitter 101 may include many of the functionalities required to perform power control in accordance with the Qi Specifications or the Ki Specification.

The power transmitter controller 203 is in particular arranged to control the generation of the drive signal by the driver 201, and it can specifically control the power level of the drive signal, and accordingly the level of the generated power transfer signal. The power transmitter controller 203 comprises a power loop controller controlling a power level of the power transfer signal in response to the power control messages received from the power receiver 105 during the power control phase.

The system of FIG. 1 uses an approach wherein properties, and specifically spatial variations, in the electromagnetic field, are measured and used to estimate the position of the power receiver relative to the power transmitter, and/or the coupling factor between the transmitter coil and the receiver coil. The approach may in many embodiments provide improved operation as an adaptation of the operation can be made to reflect the current conditions. The approach may in many embodiments achieve this while maintaining low complexity and/or low resource requirements.

Figure 5:
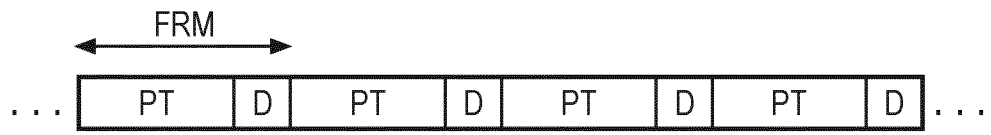
FIG. 5 illustrates an example of a time frame for the wireless power transfer system of FIG. 1.

In the example, the driver 201 and the transmitter coil 103 are arranged to generate both an electromagnetic power transfer signal for the purpose of transferring power to a power receiver and an electromagnetic test signal used for performing measurements that may e.g. be used for position and/or coupling factor estimation. The power transmitter may employ a repeating time frame for the drive signal during the power transfer phase where the time frame comprises at least one power transfer time interval and one measurement time interval. An example of such a repeating time frame is illustrated in FIG. 5 where power transfer time intervals are indicated by PT and measurement time intervals are indicated by D (the time intervals may also be referred to as Detection time intervals). In the example, each time frame FRM comprises only one measurement time interval and one power transfer time interval and these (as well as the time frame itself) have the same duration in each frame. However, it will be appreciated that in other embodiments, other time intervals may also be included in a time frame (such as e.g. communication intervals) or a plurality of measurement time intervals and/or power transfer time intervals may be included in each time frame. Furthermore, the duration of the different time intervals (and indeed the time frame itself) may in some embodiments vary dynamically.

In the approach, the measurements and the power transfer are thus separated in the time domain thereby resulting in reduced cross-interference from the power transfer to the measurement and estimation. Thus, the variability and uncertainty resulting from variations in the operating conditions for the power transfer can be isolated from the measurement and estimation resulting in a more reliable and accurate estimation process.

In the power transfer phase, the power transmitter is thus arranged to perform power transfer during the power transfer time interval of the time frames. Specifically, during these time intervals, the power transmitter 101 and the power receiver 105 may operate a power control loop. The power control loop may be based on communication within the power transfer time interval or may e.g. be based on communication outside of the power transfer time interval, such as in dedicated communication time intervals. For example, each measurement time interval may be separated by a plurality of alternating power transfer time intervals and communication time intervals. Thus, the level of the power being transferred may be dynamically varied. In the measurement time intervals of the time frames of the power transfer phase, at least one parameter of the drive signal, and thus of the electromagnetic test signal, is typically set to a predetermined value, or e.g. a value determined during an adaptation operation performed prior to the measurement time interval. Thus, in the measurement time interval, the parameter may be set to a predetermined value (i.e. being determined prior to the measurement time interval, and often prior to the power transfer phase). In contrast, the parameter may not be constrained to this predetermined value during power transfer time intervals.

For example, during a power transfer time interval, the system may operate a power control loop which allows the power level of the power transfer signal to be varied in response to power control messages from the power receiver. The power control loop may control/change at least one of a current, voltage, and frequency of the drive signal/power transfer signal. In contrast, during a measurement time interval, the parameter varied by the power control loop during the power transfer time interval may be set to a predetermined value for the current, voltage and/or frequency determined prior to the power transfer phase.

In many embodiments, a constant (typically lower) amplitude (typically voltage) of the drive signal is set during the measurement time intervals. Additionally or alternatively, a predetermined frequency may be set for the drive signal during the measurement time interval and this may typically be substantially higher than the drive signal during the power transfer time intervals.

As a result, the generated electromagnetic signal during the power transfer time intervals, the power transfer signal, typically has substantially different properties than the generated electromagnetic signal during the measurement time intervals, the electromagnetic test signal. The electromagnetic signal or field generated during power transfer time intervals will be referred to as the power transfer signal and the electromagnetic signal or field generated during measurement time intervals will be referred to as the electromagnetic test signal, or just the test signal. However, it will be appreciated that in the system of FIG. 2, the electromagnetic signal is generated from the same coil in both the power transfer time interval and the measurement time interval, and indeed the same driver etc. is used for both the power transfer time interval and the measurement time interval. Indeed, the references to the test signal may in many embodiments be considered equivalent to the power transfer signal during the measurement time interval.

The power transmitter 101 comprises an estimator 205 which is arranged to perform measurements and to estimate a position and/or coupling factor based on measurements of the generated electromagnetic field. The determined coupling factor may be a relative coupling factor or a coupling factor change.

During an interval in which measurements are performed, i.e. during a measurement time interval, the estimator 205 thus evaluates conditions of the electromagnetic field to determine measurements that can be used for the estimation. During the measurement time interval, the power transmitter 101 generates an electromagnetic test signal and the estimation is based on evaluating characteristics and properties of the electromagnetic field.

In the system, the measurements/estimation is based on detecting signals induced by the electromagnetic test signal in sets of balanced detection coils which comprises at least two detection coils 207, 209 that are arranged such that they negatively offset each other in the presence of a homogenous magnetic field, and in the presence of an electromagnetic field generated by the transmitter coil 103, such as specifically the electromagnetic test signal. Specifically, the power transmitter comprises a plurality of sets of balanced detection coils which comprises a first detection coil 207 and a second detection coil 209 which are coupled such that electromagnetic field generated by the transmitter coil (at least partially) compensate each other. A set of balanced detection coils will also be referred to as an induction balance.

Figure 6:
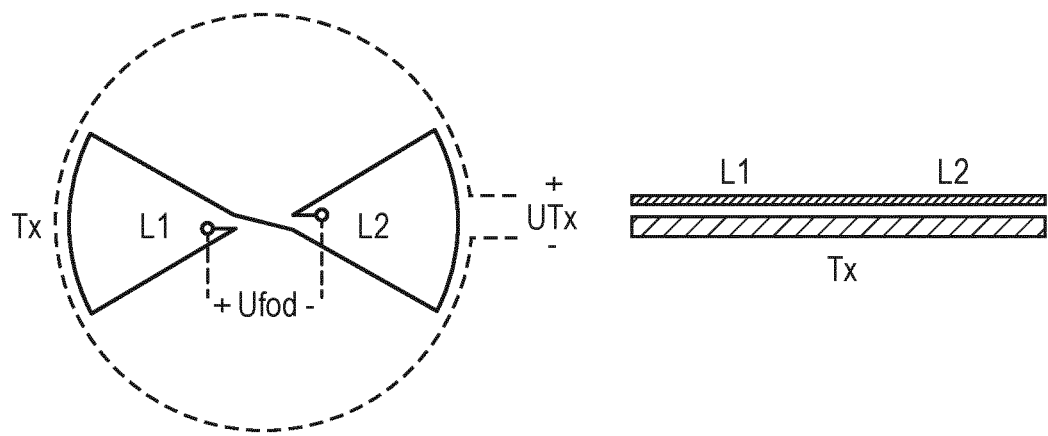
FIG. 6 illustrates an example of detection coils for a power transmitter in accordance with some embodiments of the invention.

The following description will first focus on an operation for a single induction balance, i.e. for a single set of balanced detection coils, such as e.g. illustrated in FIG. 6. For the set of balanced detection coils, the electromagnetic field generated by the transmitter coil 103 will induce a signal in the first detection coil 207 and will induce a signal in the second detection coil 209. However, the induced voltages will have opposite polarity such that the voltage (amplitude) of the series coupling of the detection coils 207, 209 resulting from the electromagnetic field generated by the transmitter coil 103 is lower than the voltage (amplitude) over at least the largest and typically of either of the individual detection coils 207, 209 resulting from the electromagnetic field generated by the transmitter coil 103. Thus, the first detection coil 207 and second detection coil 209 are coupled such that the induced voltages from the electromagnetic field generated by the transmitter coil 103 at least partially cancels each other.

The detection coils are specifically arranged to correspond to at least two windings in which opposing signals are generated by the electromagnetic test signal when a homogenous magnetic field is present over the two coils. The opposing signals may thus at least partially cancel each other and accordingly the level of the measured induced signal across the series coupling of the detection coils 207, 209 will be reduced, and potentially substantially be cancelled. This may allow much increased magnetic field strengths to be used for the measurements. Indeed, in many embodiments and scenarios, the resulting induced voltage may (ideally) be due only to differences in magnetic flux between the windings. Such differences or asymmetry between the windings may be caused by e.g. the power receiver device being positioned asymmetrically with respect to the detections coils or it could possibly be due to a foreign object being present.

An example of a detection coil arrangement is shown in FIG. 6. In the example the first detection coil 207 is formed as a first winding L1 and the second detection coil 209 is formed as a second winding L2 coupled in (anti) series such that the combined voltage of the two windings offset each other for a homogenous electromagnetic field. In the example, the detection coils 207, 209/windings L1, L2 are located opposite and symmetrically around a center point. They are further formed in a plane and the transmitter coil 103 is further formed in the same plane (or at least a substantially parallel plane). In the example, the detection coils 207, 209 are formed inside the transmitter coil 103. Further the detection coils 207, 209 are formed to have substantially the same outline and cover substantially the same area.

As a consequence, the electromagnetic flux through the two detection coils 207, 209 is substantially the same but in opposite directions. As a consequence, the induced voltage in the two detection coils 207, 209 is substantially the same but with the opposite phase/polarity and the combined voltage over the two series coupled detection coils 207, 209 is cancelled to substantially zero.

Thus the detection coils 207, 209 are arranged such that in the presence of a homogenous field, and/or in the presence of an electromagnetic field generated by the transmitter coil 103 with no other objects present, the induced signals/voltages at least partially cancel/compensate each other, ideally resulting in a zero combined voltage.

The arrangement of FIGS. 2 and 6 is such that an induced signal of a first of the two detection coils has an opposite voltage of an induced signal of a second of the two detection coils. The induced signals for the two detection coils have opposite phases for a homogenous field. The induced signals in the two detection coils have opposite phases. The two detection coils are coupled in series and in opposite phase such that the induced signals have opposite polarity. These properties exist for a homogeneous field and for the undistorted field generated by the transmitter coil 103.

The presence of a metallic foreign object may distort the electromagnetic field leading to an asymmetry between the field for the two detection coils 207, 209. This may be the case if a metallic foreign object is present in the proximity of the transmitter coil 103 but may also be the case if a power receiver is present which comprises metallic components that are asymmetric with respect to the detection coils 207, 209 (typically due to the position of the power receiver device being asymmetric with respect to the detection coils 207, 209). Thus, in such cases there will be asymmetry in the fields of the two detection coils 207, 209.

Figure 7:
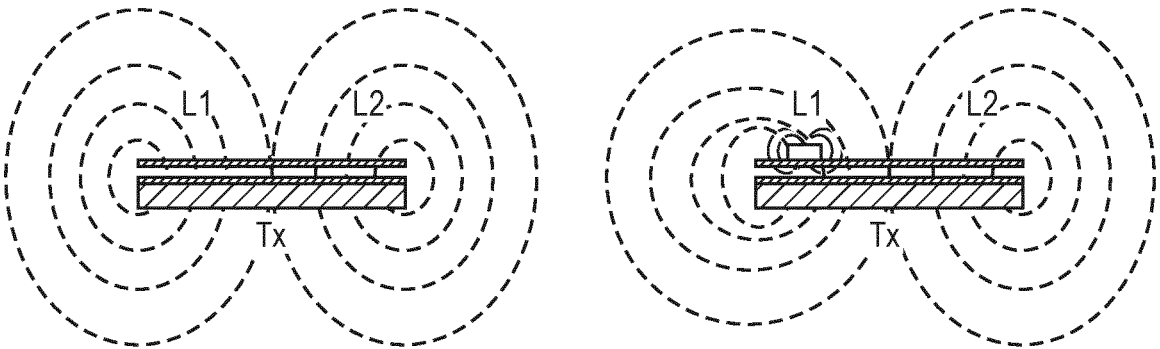
FIG. 7 illustrates an example of electromagnetic fields and detection coils for a power transmitter in accordance with some embodiments of the invention.

Typically, for a metallic object, the generated electromagnetic test signal will induce eddy currents, which results in the object generating an electromagnetic field such that the combined electromagnetic field is distorted relative to the field of the generated electromagnetic test signal. The resulting asymmetric field will result in different signals being induced in the first detection coil 207 and the second detection coil 209 as indicated by FIG. 7. In the situation where the power receiver device is symmetric with respect to the detection coils 207, 209 and where no foreign object is present, the flux through the two detection coils 207, 209 will be symmetric resulting in a substantially zero combined voltage. However, in case the power receiver does not provide a symmetric distortion or if a foreign object is present, a difference in the induced signal will occur. This difference in the induced signal of the two detection coils 207, 209 can be used to estimate a power receiver position and/or a coupling factor. It may also be used to detect the presence of the foreign object.

In the system of FIG. 2, the combined voltage of the pair of detection coils 207, 209 can be measured directly and used to perform measurements. In some embodiments, more complex approaches may be used such as coupling the detection coils in series with a transformer such that the current through the detection coils 207, 209 also flow through the primary winding of the transformer. Thus, the detection coils 207, 209 and the primary winding can be part of a series circuit through which current induced in the detection coils 207, 209 flows. The secondary winding may then be coupled to the estimator 205 and e.g. the current through the second winding can be measured and used as a measurement of the imbalance between the induced signals in the two detection coils 207, 209.

The imbalance indicated by the signal from the induction balance, specifically the output voltage, may be used as an indication of the position of the power receiver controller, the coupling coefficient (and specifically a coupling coefficient change) between transmitter coil 103 and the receiver coil 107, and/or that a foreign object is present. For example, if the signal from a set of balanced detection coils meets a criterion, such as e.g. that the absolute value exceeds a detection threshold, this may be considered to indicate that a foreign object may be present. In some embodiments, the use of balanced detection coils may thus allow the estimator 205 to implement a foreign object detection. As another example, the presence of a signal indicating an imbalance may be used as an indication of an asymmetric positioning of the power receiver or as an indication of the coupling factor (and specifically a coupling factor change).

In wireless power transfer systems, the presence of an object (typically a conductive element extracting power from the power transfer signal and not being part of the power transmitter 101 or the power receiver 105, i.e. being an unintended, undesired, and/or interfering element to the power transfer) may be highly disadvantageous during a power transfer. Such an undesired object is in the field known as a foreign object.

A foreign object may not only reduce efficiency by adding a power loss to the operation but may also degrade the power transfer operation itself (e.g. by interfering with the power transfer efficiency or extracting power not directly controlled e.g. by the power transfer loop). In addition, the induction of currents in the foreign object (specifically eddy currents in the metal part of a foreign object) may result in an often highly undesirable heating of the foreign object.

In the example of the figures, the detection coils 207, 209 are positioned opposite of each other and in the same magnetic plane as the transmitter coil 103. If such an induction balance is exposed to a symmetrical detection electromagnetic field generated by the transmitter coil 103, the voltage at the terminals of the detection coils 207, 209 is in the ideal theoretical case substantially zero.

In the approach, a signal is induced in each detection coil with balanced detection coils substantially compensating each other in case of a homogenous field (as typically is the case with no foreign object being present). The output of the detection coils 207, 209 is coupled to the estimator 205. Thus, signals are induced (by the electromagnetic field generated by the transmitter coil) in the detection coils 207, 209 and the resulting (difference) induced signal across the output of the balanced detection coils 207, 209 is fed to estimator 205. The resulting signal is then evaluated by the estimator 205. The signal evaluated by the estimator 205 is thus a representation of the signals induced in the detection coils 207, 209, and specifically is the compensated difference/sum induced signal.

If a metal piece is put on one of the sides of the induction balance, as in FIG. 7, the density of the detection electromagnetic test signal/field is no longer symmetrical and a voltage can be measured at the terminals of the induction balance. The estimator 205 may be arranged to detect the foreign object in response to a property of an induced signal from the induction balances meeting a foreign object detection criterion. Thus, a particular advantage of the use of induction balances is that it may provide very advantageous foreign object detection in many embodiments.

Similarly, if the power receiver is positioned such that a metal component of the power receiver is offset to the side of the induction balance, as in FIG. 7, the density of the detection electromagnetic test signal/field is also no longer symmetrical and a voltage can be measured at the terminals of the induction balance. The estimator 205 may be arranged to estimate the position and coupling factor (which may be a relative coupling factor) based on the imbalances. Thus, a particular advantage of the use of induction balances is that it may provide very advantageous position and/or coupling factor estimation in many embodiments. In many embodiments, the estimator 205 may use information provided by the receiver of its properties, such as e.g. the diameter of the surface contacting the power transmitter, to calculate the absolute misalignment.

As previously mentioned, the power transmitter may be arranged to control the drive signal to exhibit different parameters during the measurement time intervals than during the power transfer time intervals. This may in particular be exploited to reduce the effect and impact of the loading on the electromagnetic test signal by the power receiver.

It has been proposed to disconnect the load of the power receiver during short measurement time intervals, e.g. by the power receiver being implemented with a switch that is actively opened for this purpose. For higher power levels in the kW range, this solution is however not ideal as the disconnection switch introduces additional losses and increases cost. Indeed, in some high power applications, it is simply not feasible to implement such switching, such as for example where the load is an induction-heated metallic element in which eddy currents are directly induced by the power transfer signal to cause heating.

The adaptation of parameters for the drive signals during the measurement time interval relative to the power transfer time interval may address this and may be used to mitigate the effect of the load of the power receiver on the measurements.

In many embodiments, the driver 201 is arranged to increase the frequency of the drive signal during the measurement time intervals compared to during the power transfer time intervals, and specifically is arranged to set the drive signal frequency to be no less than 50% higher than the frequency of the drive signal during power transfer time interval. The driver 201 may accordingly generate the electromagnetic test signal to have a substantially higher frequency than the power transfer signal.

In many scenarios, increasing the frequency substantially may improve measurements, estimation, and detection, and may reduce the impact of the power receiver load. For example, the power transmitter and power receiver may both have resonance circuits formed for the power transfer, e.g. the transmitter coil 103 and the receiver coil 107 may both be part of resonance circuits, e.g. with a resonance frequency of $f_{res}$=25 kHz. Increasing the drive frequency during the measurement time interval (e.g. to kHz) will result in the power transmitter resonance circuit operating in an inductive mode resulting in a reduced current in the transmitter coil 103. Furthermore, the receiver coil current is also reduced because the system is no longer tuned. This will further reduce the power transmitter current. The overall effect will correspond to the effect that would result from a partly disconnected load.

In many embodiments, the driver 201 may be arranged to reduce the voltage of the drive signal during the measurement time intervals relative to the power transfer time interval, and specifically may set the voltage amplitude of the drive signal during the measurement time intervals to be no higher than 50% (or often 25 or even 10%) of the voltage amplitude of the drive signal during the power transfer time intervals.

The reduced voltage may generate an electromagnetic test signal that has reduced intensity, and thus the electromagnetic field generated during the measurement time intervals is lower than during the power transfer time interval and the loading by the load may be reduced correspondingly. This may in many scenarios allow improved estimation based on measurements in the measurement time interval. In some embodiments, the reduced voltage may be an advantage as it may result in a disconnection of the power receiver load. For example, if the voltage is reduced to a certain level, a power receiver including a rectifier and a battery will be driven by the battery as the induced voltage does not become sufficient for the rectifiers to conduct. This will effectively disconnect the load from the electromagnetic test signal which may improve measurement performance.

In many embodiments, the driver 201 may be arranged to set the voltage amplitude of the drive signal to be constant during the measurement time intervals. This may result in a more homogenous electromagnetic test signal being generated which may improve measurements and indeed foreign object detection based on balanced detection coils 207, 209. For example, if the voltage amplitude is time varying, the test signal, and thus the indicated imbalance signal from the induction balances, will vary and unless this variation can be compensated for, or taken into account, the estimation accuracy will be reduced.

In many embodiments, the driver 201 may be arranged to generate the drive signal to during the measurement time interval have a voltage amplitude which is constant and at least 50% lower, and a frequency at least 50% higher, than the drive signal during the power transfer time interval.

As an example, during the power transfer time interval, the drive signal is generated with a first operating frequency close to the resonance frequency of both the power transmitter and the power receiver in order to transmit wireless power with high efficiency.

During the measurement time interval, a first operating frequency of the drive signal is moved away from the resonance frequency of both the power transmitter and power receiver, to a second higher operating frequency. This second higher operating frequency of the drive signal may be fixed at a predetermined value which is at least a factor of 1.5 higher than the first operating frequency, i.e. the frequency of the power transfer signal.

In addition, the drive signal voltage Uinv is changed to a second amplitude (e.g. provided by a different voltage source) which is constant and lower than during the power transfer time interval.

With the drive signal having the second higher operating frequency and the second lower and constant voltage amplitude, the current through the transmitter coil 103 coil is strongly reduced and kept constant. Furthermore, because the driver current is lagging the driver signal voltage, switching noise is strongly reduced because the inverter at the output of the driver 201 operates in a zero voltage switching scenario.

Figure 8:
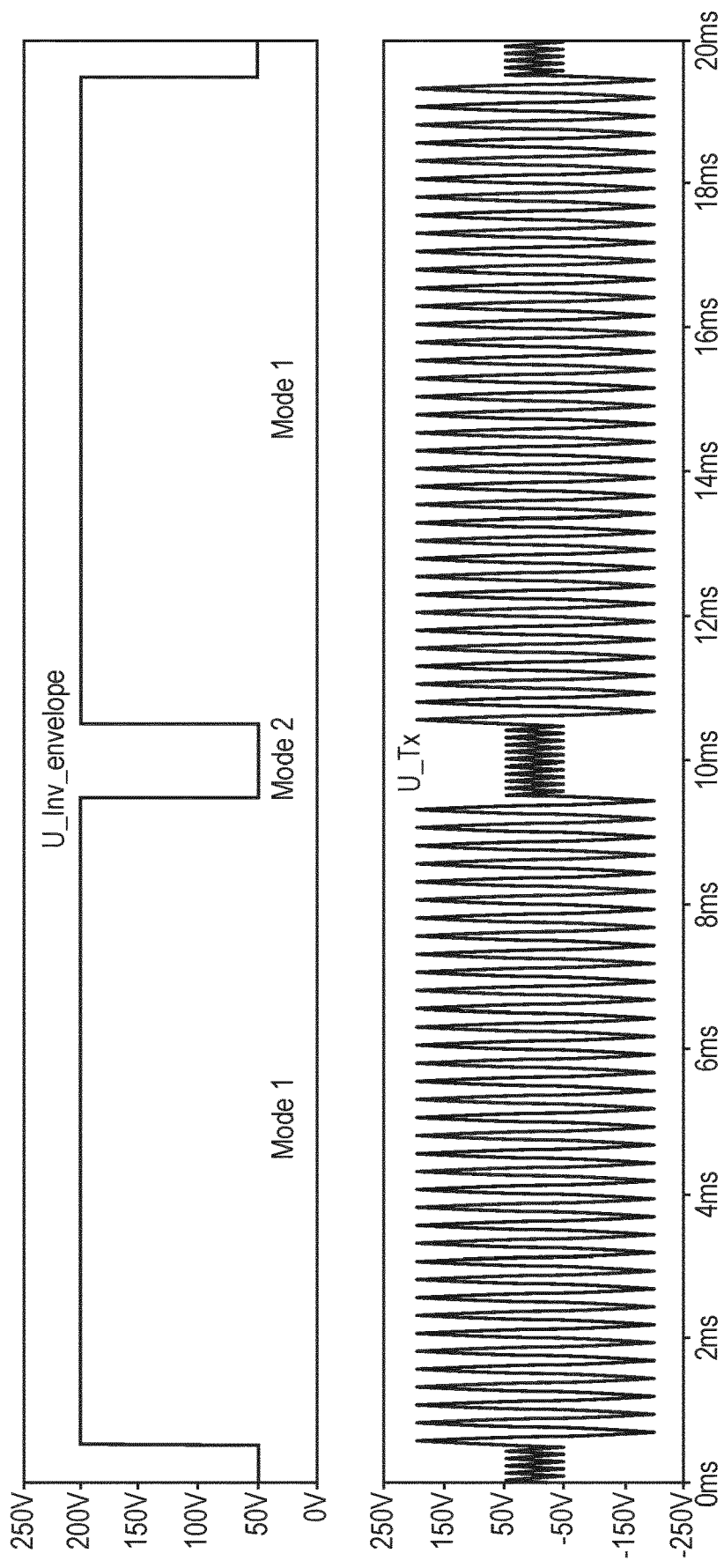
FIG. 8 illustrates an example of a drive signal for a power transmitter in accordance with some embodiments of the invention.

An example of the drive signal amplitude for such a scenario, is shown in FIG. 8 where the operation during power transfer time interval is referred to as Mode 1 and the operation during measurement time interval is referred to as Mode 2. In this example, the voltage amplitude is also constant during the power transfer time interval, e.g. due to the inverter being supplied by a constant voltage source.

Figure 9:
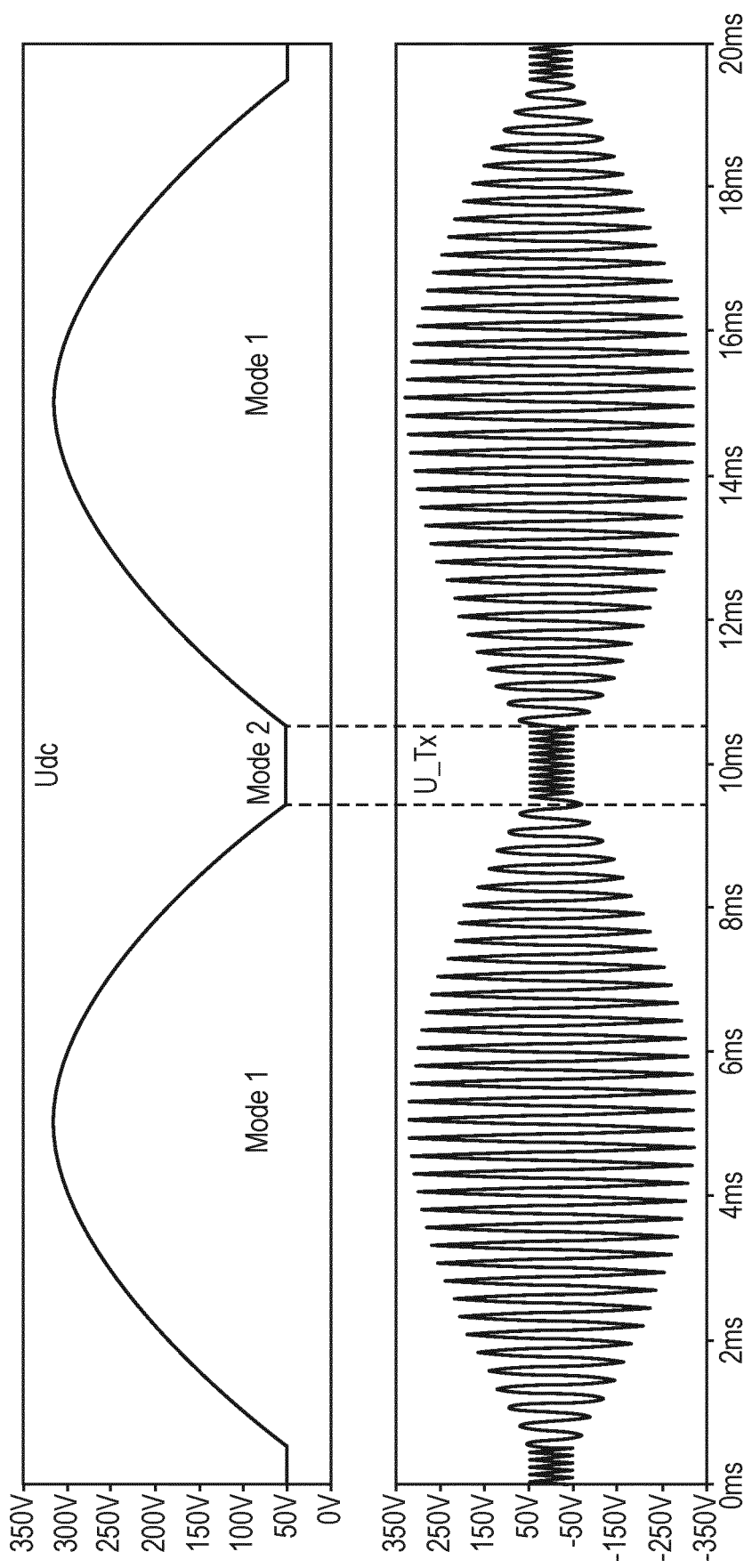
FIG. 9 illustrates an example of a drive signal for a power transmitter in accordance with some embodiments of the invention.
Figure 10:
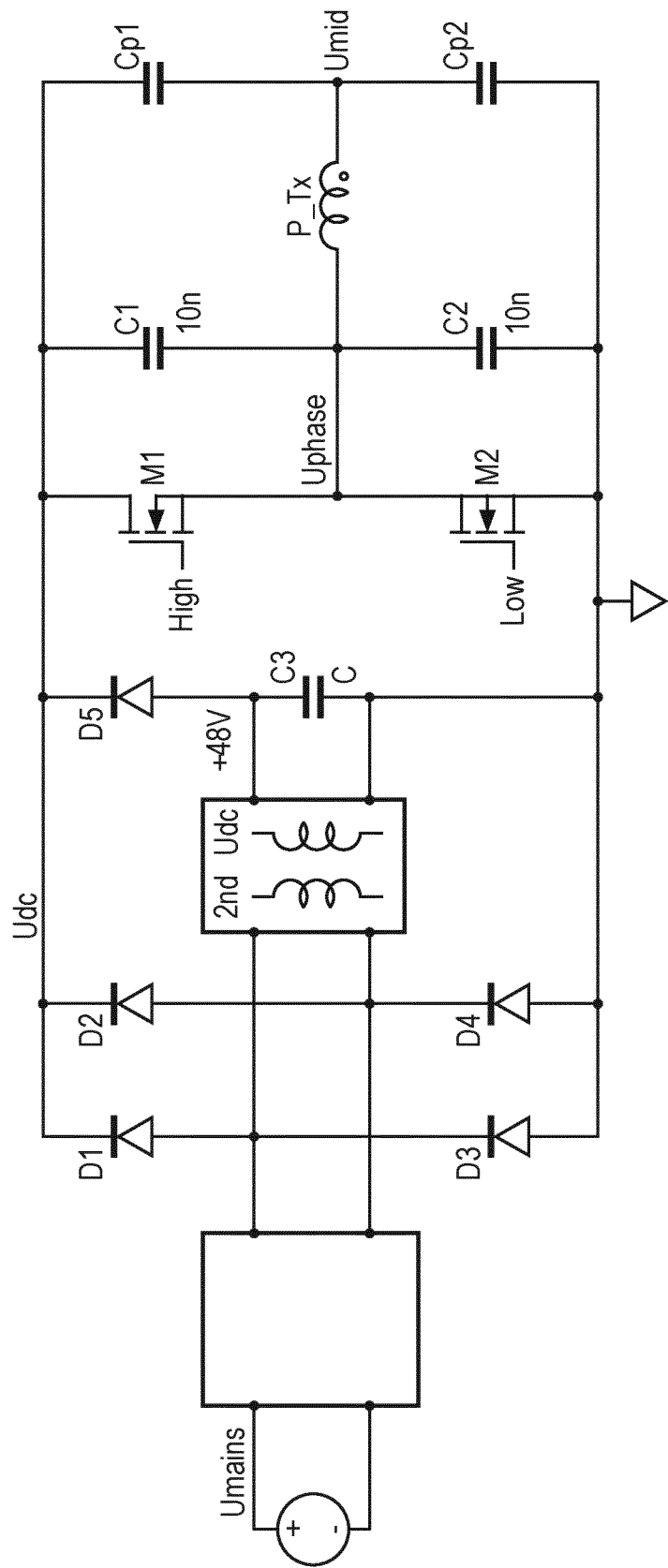
FIG. 10 illustrates an example of elements of a power transmitter in accordance with some embodiments of the invention.

FIG. 9 illustrates a corresponding example where the voltage amplitude is varied during the power transfer time interval. This may for example be achieved by the inverter being supplied by a voltage which is a rectified (but not smoothed) AC voltage. The supply voltage during measurement time intervals, which may be synchronized with the zero crossings of the AC signal, is provided through an alternative power supply which provides a substantially constant voltage. An example of a circuit that may generate such a drive signal is illustrated in FIG. 10. In the circuit, the output inverter circuit (M1, M2, Cp1, Cp2) is driven by a rectified AC mains voltage, except when the rectified voltage falls below a given voltage (in the example 48V) of a smoothing capacitor C3 fed by a second supply circuit ($2^{nd}$ Udc). During this time, the inverter circuit is supplied by the smoothing capacitor C3 via D5 resulting in a substantially constant supply voltage and consequently constant drive signal voltage amplitude.

In such examples, the transmitter coil 103 generates an electromagnetic test signal corresponding to a substantially constant electromagnetic field for measurements during the measurement time interval with the electromagnetic test signal having the predetermined higher second operating frequency. The amplitude of the estimation electromagnetic field/electromagnetic test signal is mainly determined by the second lower output voltage of the driver 201. In this case, a non-disconnected load of a power receiver is effectively detuned from the power transmitter and therefore it has a reduced impact on the electromagnetic field/electromagnetic test signal.

In the specific system described, the power transmitter comprises a plurality of induction balances, i.e. a plurality of sets of balanced detection coils, and the position/coupling coefficient estimation, as well as the foreign object detection, may be based on the output signals from two or more of these sets of balanced detection coils.

Figure 11:
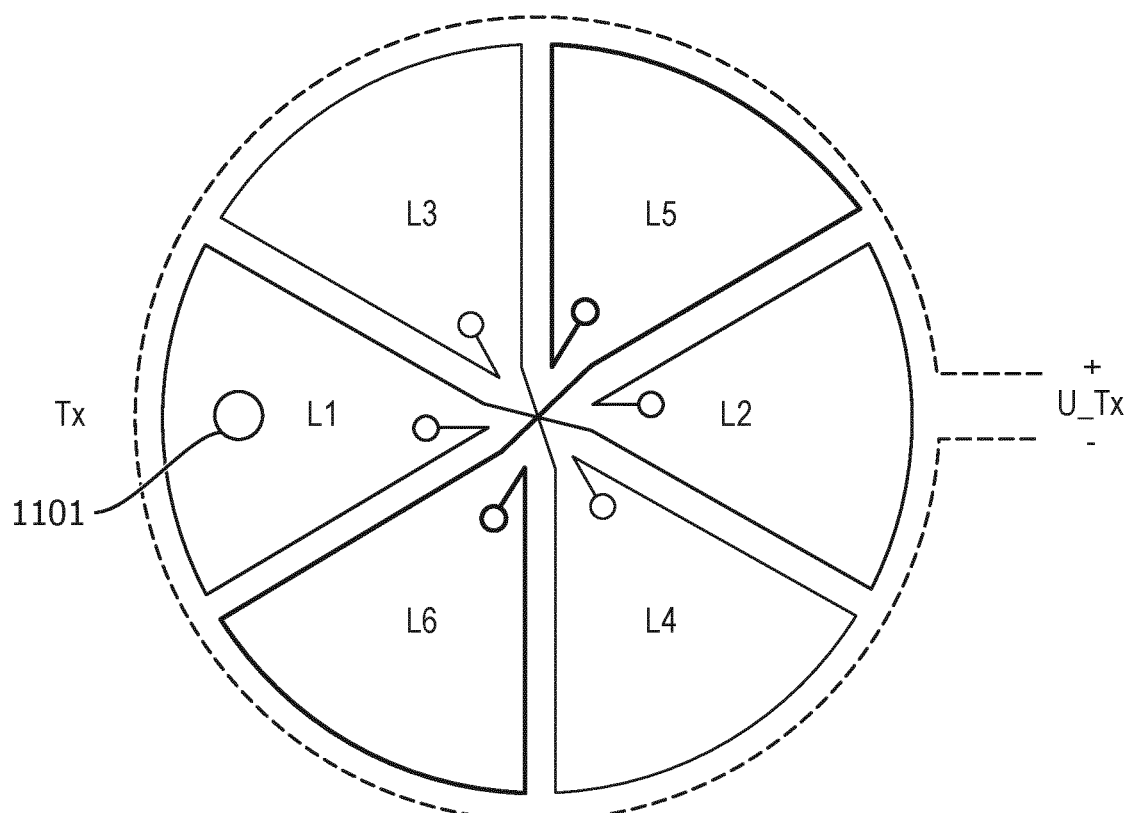
FIG. 11 illustrates an example of detection coils for a power transmitter in accordance with some embodiments of the invention.

For example, as illustrated in FIG. 11, the power transmitter may be generated to include three sets of balanced detection coils with each set comprising two wedge shaped coils. In this example, the estimator 205 may measure the output signal from each of the three balanced detection coil pairs and use these signals to perform a position estimation, coupling coefficient compensation, and/or foreign object detection. The exact criterion used will depend on the preferences and requirements of the individual embodiment.

In many embodiments, as indeed in the example of FIG. 11, the balanced detection coils are located within the transmitter coil 103. This may typically provide improved performance, and may in particular provide an electromagnetic test signal/field which is homogenous for the different coils.

The use of multiple induction balances may provide improved performance in many embodiments and may in particular provide additional information of the inhomogeneity of the magnetic field. In particular, it may provide indications of a spatial property of the inhomogeneity. This may be used to generate an estimation of a position of an object causing the inhomogeneity and specifically to generate an estimation of the position of the power receiver as this will in many scenarios (and especially in the absence of a foreign object) be the source of the inhomogeneity. Likewise, the signals from the multiple induction balances may be used to generate an estimate of the (e.g. relative) coupling factor between the power transmitter and the power receiver. This (e.g. relative) coupling factor estimate may be generated by first generating a position estimate for the power receiver and then converting this to a coupling factor estimate, which in many embodiments will be a relative coupling factor estimate. In other embodiments, the (relative) coupling factor estimate may be generated without relying on an explicit intermediate position estimate being generated.

Thus, in the power transmitter of FIG. 2, the estimator 215 is arranged to determine a position estimate for the power receiver in response to signals from the plurality of sets of balanced detection coils during the at least one measurement time interval. In some embodiments, the estimator may be arranged to determine a (typically relative) coupling factor estimate for the power receiver in response to signals from the plurality of sets of balanced detection coils during the at least one measurement time interval. The (typically relative) coupling factor estimate may be generated without generating a position estimate.

As an example, in the arrangement of FIG. 11 three induction balances may be used to provide an indication of where the source of inhomogeneity is. For example, if an object 1101 (which in principle could be a small power receiver device) is present within detection coil L1, the induction balance of L1-L2 may generate a substantial signal whereas the other induction balances L3-L4, L5-L6 may generate low signals as the field through the corresponding detection coils are substantially homogenous. Thus, the position of the object 1101 can be deduced to be closest to L1 (and in the specific case within L1). The differentiation between whether the object 1101 is close to L1 or L2 can typically be determined by comparing the phase of the induction balance signal with the drive signal generating the electromagnetic test signal (as the two detection coils will induce signals of opposite phases).

In many embodiments, and as indicated by FIG. 2, the output of all induction balances/sets of balanced detection coils are fed to the estimator 205 which may measure the signals from all of the induction balances. The estimator 205 may determine the voltage and/or current for each of the sets of balanced detection coils during the measurement time intervals, e.g. typically the voltage of each set of balanced detection coils may be determined and used for the position/coupling factor estimation.

In many embodiments, the power transmitter of FIG. 2 comprises a compensator 211 which is arranged to compensate the signal from one, more, and typically all of the sets of balanced detection coils for an imbalance between the signals induced in the two detection coils when no foreign object is present, and possibly also when the power receiver is at a nominal or preferred position. In some embodiments, the compensation may include a static compensation that e.g. compensates for differences in geometric properties of different detection coils in the same set of balanced detection coils. The static compensation may be a compensation for imbalances which is independent of the presence of the power receiver, and may specifically be a compensation for imbalances when no power receiver is present.

In many embodiments, the compensator 211 may be arranged to perform a dynamic compensation which is dependent on the presence of the power receiver, and which specifically may be dependent on the position of the power receiver. In the dynamic compensation the compensation value may be adapted during operation, such as e.g. when specific events occur. The dynamic compensation may typically determine a combined compensation value that also include compensation for static imbalances which are due to asymmetry of the power transmitter and which are present even when no power receiver is present.

The dynamic compensation may be performed during operation and power transfer and may determine a compensation which includes both a static compensation component and a dynamic compensation component. The static compensation component may be a compensation component compensating for imbalances when no power receiver is present or when the power receiver meets nominal requirements, such as having specific predetermined properties and/or being positioned at a predetermined position (typically the preferred and/or central position with respect to the transmitter coil). The dynamic compensation component may be a compensation component which varies with the varying operating conditions and thus is a component that may vary during operation. It may specifically vary with the position of the power receiver.

The dynamic compensation component may in many embodiments be determined by the dynamic compensation process determining a combined compensation for the current conditions and then subtracting a static compensation component e.g. determined prior to the power transfer.

In practice, the detection coils 207, 209 may be generated to be as identical to each other as possible, and may be designed to cancel induced signals as much as possible. However, in practice, it has been found that there tends to be some asymmetry and differences in the parameters of the detection coils 207, 209 as well as possibly in the electromagnetic environment even in the presence of no foreign objects and with no (or a symmetric) power receiver being present. Further, the asymmetry and imbalance may in many scenarios result in a combined voltage over the detection coils 207, 209 being in the same order of magnitude as the voltage caused by power receiver position offsets or some foreign objects that are desired to be detected. Therefore, even using balanced inductance/detection coils may in some embodiments result in difficult or less than ideal estimation and detection performance.

The compensator 211 may be arranged to compensate the signals by measuring a value during a measurement time interval, and typically under the assumption that no foreign object is present, i.e. the signals resulting from the test signal may be determined when it is assumed that no foreign object is present. This may for example be indicated by a suitable foreign object detection having resulted in no detection of a foreign object, or may e.g. be considered the case in response to a specific user input being provided indicating that no foreign object is present. For example, the user may press a button to initialize a calibration/compensation measurement. In some cases, the compensation measurement may be performed when a new power receiving device is detected and when the user positioning the new power receiving device on the power transmitter indicates that the user has checked that there are no foreign objects present.

In many embodiments, a static compensation may be performed when no foreign object and no power receiver is present and the resulting compensation values may be stored as the static compensation component, which e.g. may be used during dynamic compensations to determine the dynamic compensation component.

Based on the measurement of the imbalance (which reflects the signal from the sets of balanced detection coils when no foreign object is present), compensation values may be determined and applied to each of the signals. Typically, the compensation value may be the opposite of the measured imbalance such as to (at least partially) cancel the imbalance. For example, the voltage or current amplitude of the output signals from the sets of balanced detection coils may be measured when no foreign object is present. Subsequently, this measured amplitude may be subtracted from the measured amplitude of the signals from the sets of balanced detection coils to generate compensated signal amplitudes. These compensated signal amplitudes may then be used in the evaluation of the foreign object detection criterion rather than the measured amplitudes of the signals.

The compensator 211 may specifically generate a compensation value that offsets (has the opposite phase/polarity) of the signal value from a set of balanced detection coils measured when no foreign object is (assumed to be) present.

In some embodiments, the compensation may not be a single value, such as a compensation current or voltage amplitude, but may be a compensation signal such as e.g. one with the same amplitude as the measured signal but with opposite phase (thus cancelling the imbalance signal). For example, a compensation signal may be generated to have a frequency that is the same as the measured signal (and as such the same as the electromagnetic test signal). The phase and/or amplitude may be set to values that provide the desired compensation.

The compensation may in many embodiments provide improved estimation and also foreign object detection. Indeed, even if the detection coils 207, 209 were perfectly balanced and/or perfectly characterized during a manufacturing phase, the electromagnetic field and thus the induced signals will also depend on the specific environment and in particular will tend to vary depending on e.g. which power receiving appliance is used and exactly where this is positioned. Therefore, being able to dynamically adapt the compensation and specifically to calibrate it to the current electromagnetic environment may substantially improve performance. The compensation may be useful to mitigate or reduce imbalances between detection coils and/or the environment around these. This may provide improved performance in many scenarios and may specifically provide a more accurate estimation and foreign object detection.

The compensation may in many embodiments provide a substantially more accurate foreign object detection as imbalances caused by other features than a foreign object can be compensated for. However, in addition, the compensation may be used to generate a position/coupling factor estimate. In many embodiments, the compensation value, and specifically the dynamic compensation values, that are applied in order to cancel (at least partially) imbalance signals when no foreign object is present, may also be used to generate such estimates. Thus, not only may the compensation improve foreign object detection, but it may also facilitate and possibly improve position estimate/coupling factor estimation (including a coupling factor change estimation).

A particular advantage of such an approach is in many scenarios and embodiments that the properties for the different operations can be individually adapted. Typically, the foreign object detection is performed frequently and with quick reaction times so that the presence of a foreign object can be detected very quickly. The foreign object detection is typically also based on small imbalance signals.

The compensation may in many embodiments and scenarios be performed less frequently and with a slower update rate/reaction time. The characteristics of the different operations may thus be different, and these can be optimized for the specific operation. The position and coupling factor estimation may typically have similar properties to those required for the compensation as indeed changes in compensation are typically caused by changes in the position of the power receiver.

Figure 12:
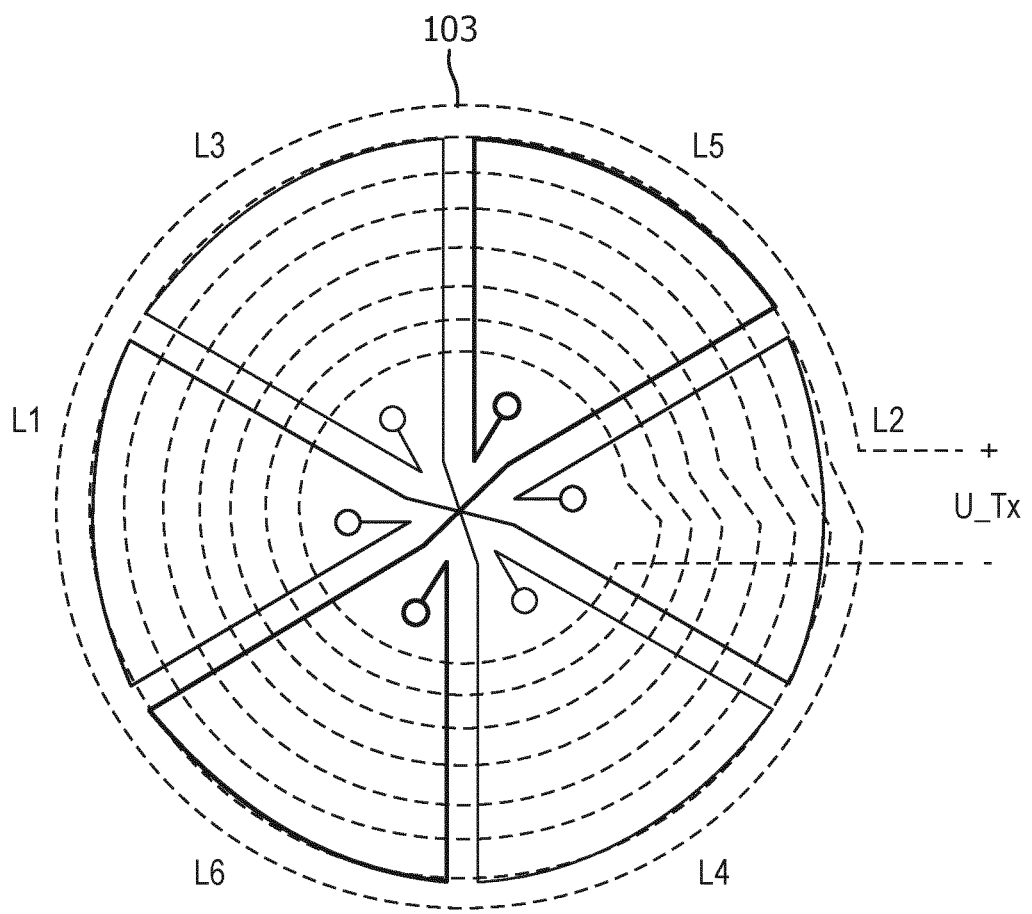
FIG. 12 illustrates an example of detection coils for a power transmitter in accordance with some embodiments of the invention.

As an example, the arrangement of FIG. 12 may be considered for a system where the foreign object detection is based on measuring voltage amplitudes Ufod from sets of balanced detection coils each comprising two detection coils (L1, L2), (L3, L4) and (L5, L6).

In this example, before initiating power transfer, a static calibration of the foreign object detection system may be performed to compensate/remove the original offsets from the voltages Ufod (L1-L2), Ufod (L3-L4) and Ufod (L5-L6). These offset voltages may be due to an inhomogeneous detection H-field. In the example, the windings of the transmitter coil 103 are not completely circle symmetrically mounted on the coil former. In this example induction balance L3-L4 and L5-L6 capture more or less the same homogeneous detection H-field. However, the magnetic field captured by induction balance L1-L2 is not homogeneous due the local wiring layout of the transmitter coil 103 under coil L2. For this condition, active calibration can be applied by compensation of the voltage Ufod (L1-L2) of induction balance L1-L2 with a signal Ucomp (L1-L2) with the right amplitude and phase with respect the voltage U_Tx.

This initial compensation may be performed without the power receiver present and thus a determination of the asymmetry of the power transmitter itself can be determined and used to reflect the static compensation component.

Figure 13:
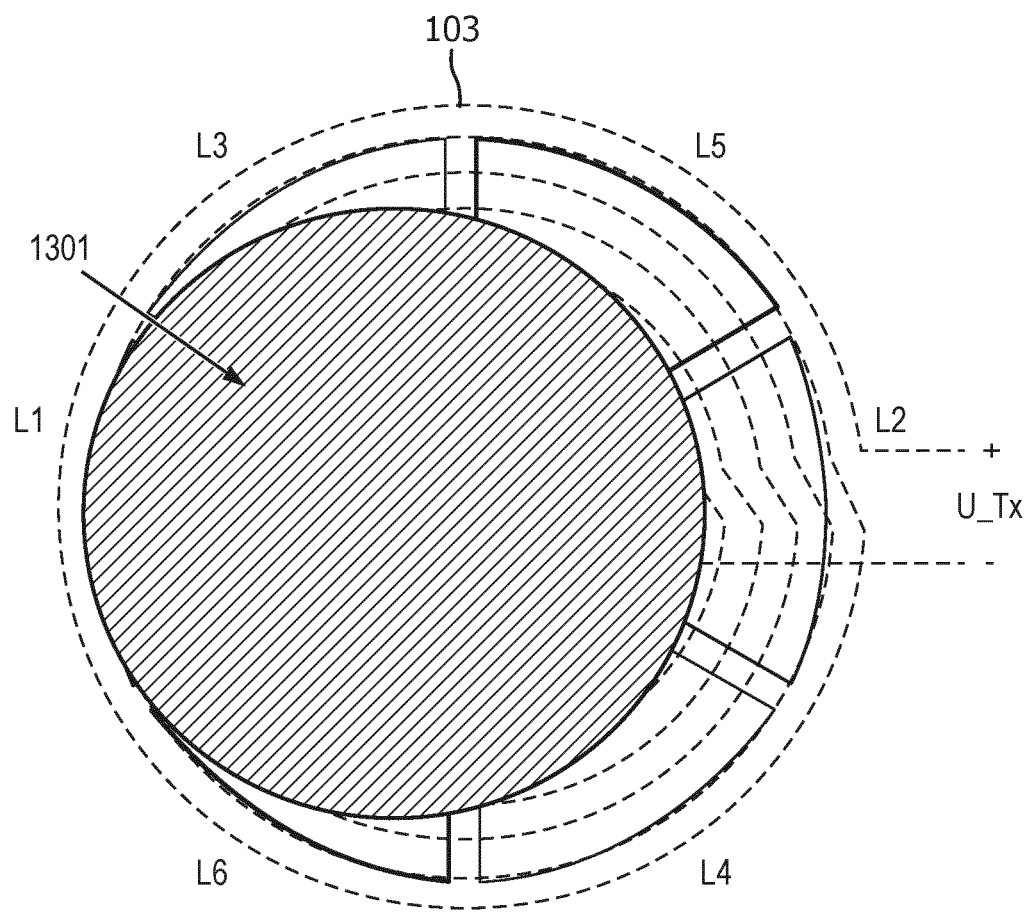
FIG. 13 illustrates an example of a power receiver device and detection coils for a power transmitter in accordance with some embodiments of the invention.

FIG. 13 shows another cause of offset voltages when a power receiver is present. If a power receiver device/appliance 1301 is positioned on the active area of the power transmitter with a misalignment, it is to be expected that the detection H-field from the transmitter coil 103 is even more distorted and that it becomes inhomogeneous, especially if the appliance includes metal parts.

In this example, an active offset calibration may also be performed. Due to the size of the appliance 1301 with respect to the size of active area it is plausible that the distribution of the detection H-field from the transmitter coil 103 becomes inhomogeneous over a large area, and likely over the entire area. As a result, all three induction balances are affected and generate signals with an offset. In this situation three independent compensation voltages Ucomp (L1-L2), Ucomp (L3-L4) and Ucomp (L5-L6) may be determined and applied to the three induction balances respectively with each of these having the right amplitude and phase with respect the voltage induced offset imbalance signal.

This second compensation with the power receiver present may be performed during operation and specifically during the measurement time intervals. The resulting compensation values may be applied to the signals from the induction balances when performing the foreign object detection. However, in addition the compensation values may be used to generate a position estimate and/or a coupling factor estimate. The static compensation values determined during the test with no power receiver may be subtracted from the measured compensation values to generate the dynamic compensation component which more accurately reflect (just) the effect of the asymmetric positioning of the power receiver. The estimates may then be generated based these dynamic compensation components from the induction balances.

Figure 14:
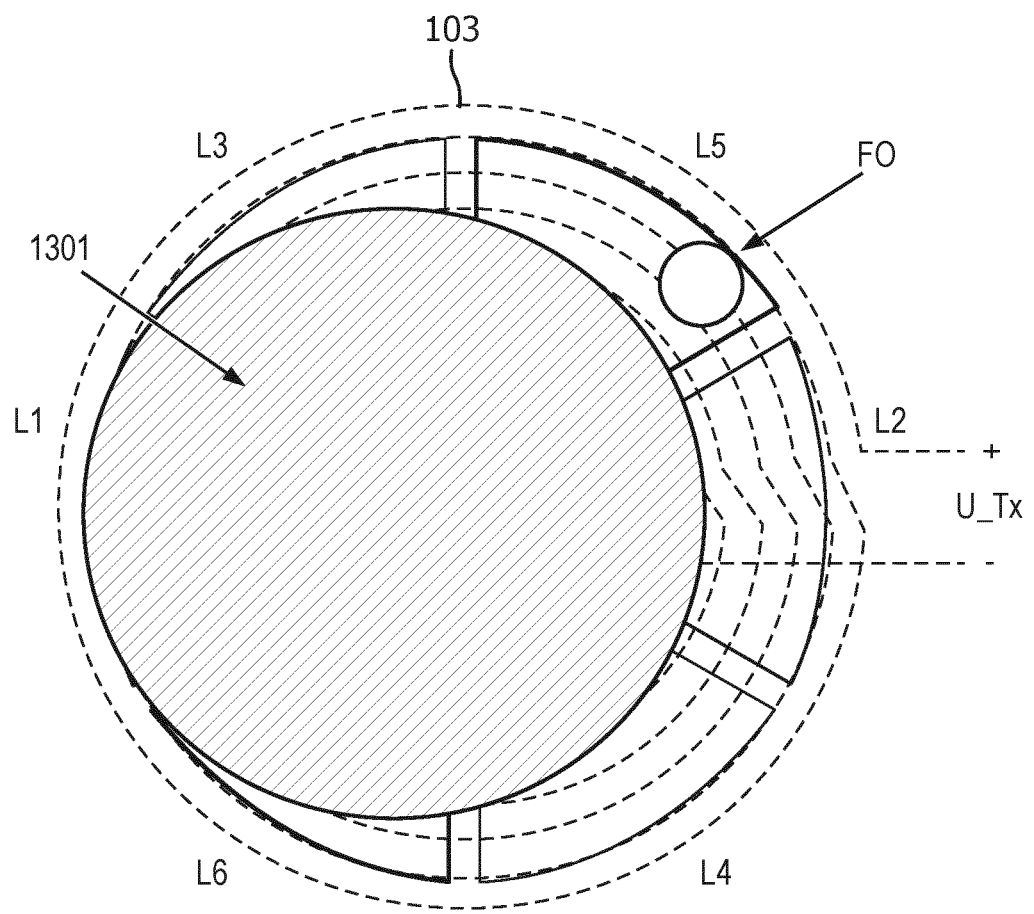
FIG. 14 illustrates an example of a power receiver device and detection coils for a power transmitter in accordance with some embodiments of the invention.

In the example of FIG. 14, a foreign object FO is placed on the active area after the active calibration/compensation has been performed and with the compensations being applied. Due to its location on the active area, it is to be expected that the detection H-field from the transmitter coil 103 becomes inhomogeneous near induction balances L1-L2 and L5-L6. As a result, a detection voltage appears at the terminals of both of these induction balances leading to an indication that a foreign object is present. It is however unlikely that the foreign object will cause an imbalance in the third induction balance L3-L4. The estimator 205 may determines that a foreign object has been detected. Thus, as illustrated, the triple induction balance system is able to detect a foreign object, even if a misaligned appliance is located on top of the active area.

Figure 15:
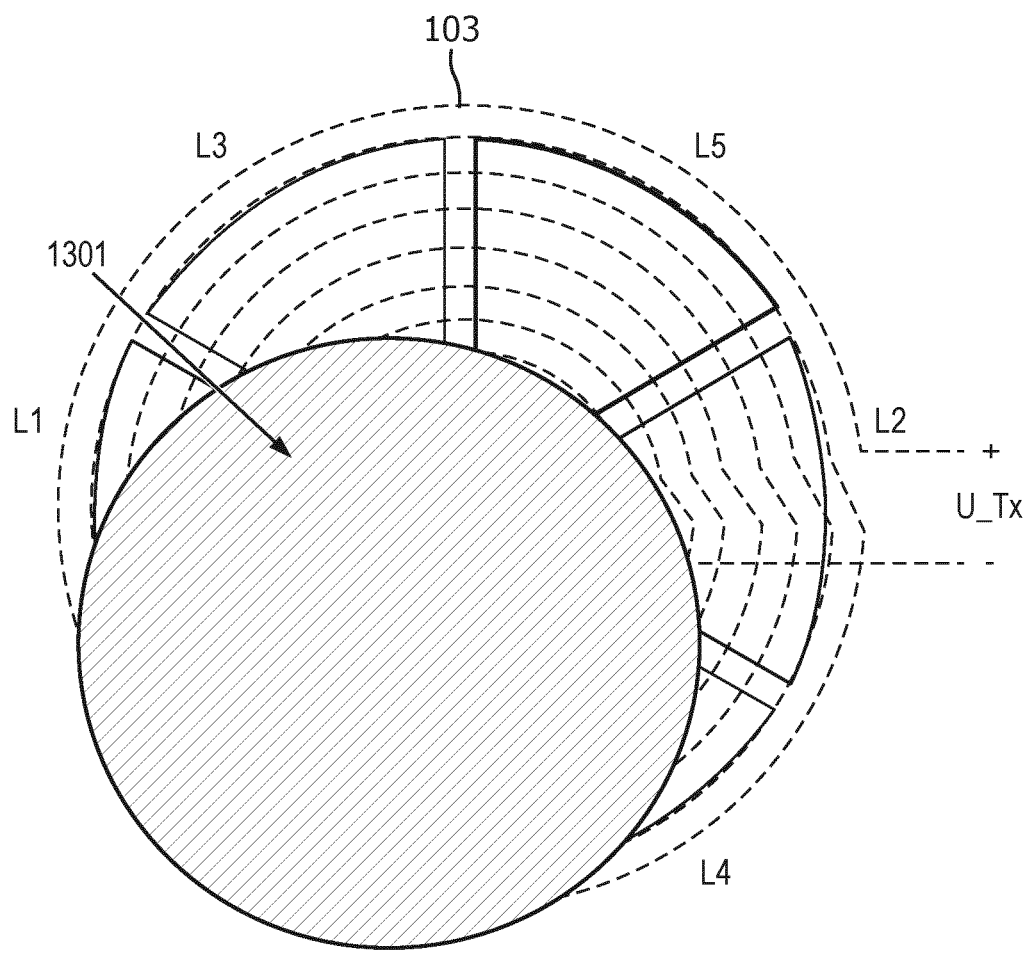
FIG. 15 illustrates an example of a power receiver device and detection coils for a power transmitter in accordance with some embodiments of the invention.

In the example of FIG. 15, there is no foreign object but instead the appliance 1301 has been moved from its original position on the active area. This displacement results in a change of the distribution of the detection H-field of the transmitter coil 103 (i.e. the test field) over the full detection area. As a result, the signals from the induction balances change noticeably which may render foreign object detection less accurate.

When performing a compensation following the move, the compensation values will change substantially from previously in order to compensate for the new asymmetry. Applying the new compensation values will again result in accurate foreign object detection. In addition, the changed compensation values can be used to update the position and/or coupling factor estimates.

The compensator 211 may be arranged to update/adapt/calibrate the compensation at different times and in different situations depending on the preferences and requirements of the individual embodiment. In many embodiments, the compensator 211 may be arranged to initiate an adaptation of the compensation when it is detected that a new power receiving appliance is positioned on the power transmitter. This may allow the compensation to not only be adapted to the static properties but also e.g. to the position of the power receiving device on the power transmitter. Further, in many embodiments, a new dynamic compensation may be performed at regular intervals, and typically relatively frequently. In some embodiments, a new compensation may be performed when changes in the signal values have been detected but the foreign object detection algorithm has determined that a foreign object is not present (e.g. due to all induction balances showing significant changes).

The estimator 205 may use different approaches for estimation in different embodiments. The estimation of position and/or coupling factor is based on the imbalance indicated by the signals from the induction balances. In some embodiments, the signals are measured directly and used directly. For example, the estimator 205 may comprise measurement circuitry which during the measurement time intervals measure the signals from the induction balances and use these to estimate the position. This approach may for example be used in embodiments where no (dynamic) compensation is used or may e.g. be used to determine relative positions/coupling factors relative to those when the (most recent) compensation/calibration was performed.

In other embodiments, the imbalances and the signals from the induction balances are represented by compensation values determined during a compensation/calibration. The compensation values can be considered to correspond to a measurement of the signals from the induction balances at the time of the compensation determination (and when no foreign object is present), and the dynamic compensation component can be considered to correspond to the component of the imbalance which is likely to be due to the presence, and the position, of the power receiver. Using the compensation signals rather than directly making measurements of the signals may facilitate processing and operation, and in particular may facilitate using the set of induction balances for both position/coupling factor estimation and for e.g. foreign object detection.

In the following, the term measurement signals will be used to refer to the signals from the induction balances which are used for the position/coupling factor estimation. It will be appreciated that the measurement signals may in different embodiments correspond to the compensation signals, the dynamic compensation components of these, or directly (currently) measured signals from the induction balances.

In most embodiments, such as those illustrated in the figures, the imbalance for a given induction balance will tend to increase the further the power receiver is offset from the center position. The amplitude of the imbalance may thus be an indication of how far the power receiver is offset from this center position. The amplitude may also be dependent on the distance in a direction orthogonal to the main direction of the induction balance and thus may decrease with the offset in this direction. The direction of the offset will affect which of the detection coils will experience the largest induced signal and thus the phase of the measurement signal may be indicative of the direction of the offset. The phase may be determined by comparing the phase of the measurement signal to that of the test signal and with the phase difference indicating in which direction the power receiver is offset.

Thus, in some embodiments, a position estimate along an axis of an induction balance may be determined as a function of the amplitude and phase of the estimation signal from that induction balance. This may be repeated for all induction balances resulting in position indications along the axes of the induction balances. The position estimate for the power receiver may then be determined by combining these positions estimates. E.g. the position estimate may be generated as the position for which the projections on the respective induction balance axes result in the minimum sum square error.

In many embodiments, the positions estimates are not separately determined for each induction balance but rather a combined and joint estimate is generated. For example, as mentioned, the amplitude of the measurement signal may not only depend on the offset along the axis of the induction balance but may also depend on the direction in the orthogonal direction. However, position offsets in this direction are likely to have significant impact on the imbalance for other induction balances and the measurement signals for these may be used to compensate the first measurement signal for the position offset in the orthogonal direction. For example, prior to the determination of a position estimate along an axis of an induction balance, the measurement signal may be normalized based on signal amplitudes of the other measurement signals.

In many embodiments, the position estimation may be based on previous characterization, e.g. during manufacturing. For example, during manufacturing, the measurement signals for a given power transmitter and power receiver combination may be measured for many different positions. The results may be stored in a memory of the power transmitter as an N-input LUT (Look-Up Table) where N is equal to the number of induction balances. During operation, the measurement signals may be used to perform a table look-up where the entry closest to the measurement signal values (e.g. represented by an amplitude and phase) is retrieved. This retrieved position may then be used as the position estimate.

In such embodiments, a LUT may be generated for a range of different power receivers or type of power receivers. These LUTs may all be stored in memory of the power transmitter and the appropriate LUT may be selected, e.g. in response to data received from the power receiver indicating the type of power receiver it is (and thus indicating which LUT most closely reflect the power receiver currently being supported).

In many embodiments, information about the power receiver properties may be stored in memory of the power receiver and communicated to the power transmitter, e.g. during initialization or configuration. This information could for instance be the diameter of the receiver coil, a resonance frequency, load impedance etc. The power transmitter may then use the information in determining the position/coupling factor. For example, it may be used to select a LUT comprising data generated for a power receiver with similar properties.

In some embodiments, the position estimate may be based on a consideration of a known distance in the direction orthogonal to the coils (the z-direction). In many scenarios, the Z-distance may be unknown or variable but in some embodiments, it may be constant and/or known (and e.g. stored during manufacturing). In some embodiments, the z-distance may be determined or learned during operation. In cases where the z-direction is known, this may be taken into account when determining the position and/or coupling factor. This may remove an unknown parameter/variable thereby allowing e.g. absolute values to be determined.

In many embodiments, the position estimate may be a relative position estimate and may e.g. be used to indicate how far a power receiver has been moved from a previous position. Indeed, in many embodiments, one of the distances will tend to not be known, and in particular the z-distance in the direction orthogonal to a plane of planar transmitter and receiver coils will not be known. E.g. typically, the distance between the power receiver coil and the transmitter coil and the induction balances is not known as these may vary between different power receivers, or e.g. be an unknown property of the power transmitter at the time of design. For example, if the power transmitter is to be implemented as part of a kitchen worktop, it may not be known how thick the worktop is.

The properties of the measurement signals may depend on the z-distance and therefore determining an absolute position may be difficult or unreliable. However, in such systems, the approach may often be used to determine a relative position, and specifically a position change.

Such an approach may for example be combined with compensation. For example, at a given point during operation, a compensation/calibration may be performed which cancels the imbalances measured by the induction balances. The signals from the induction balances may then be measured and a change in position may be determined in response to the current signals, i.e. the current signals after compensation may be used as measurement signals to determine a position change relative to that of the compensation.

In some embodiments, the power transmitter and/or the receiver may comprise a user interface 215 which may be arranged to provide a user output indicating of there is a misalignment of the power receiver. The misalignment may be determined in response to the position estimate meeting a requirement. For example, if the position estimate indicates that the power receiver deviates too far from a preferred position, a user alert or indication may be generated. The preferred position may specifically correspond to the position for which the signals from the induction balances indicate that there are no imbalances. In many embodiments, the preferred position may a central position with respect to the transmitter coil and/or may be the position for which the coupling factor (or coupling factor change) between the transmitter coil and the receiver coil is maximum. In the example where the user interface is (possibly also) provided at the power receiver, the power transmitter may comprise a communicator which can communicate and indication of the position estimate to the power receiver, which can then process this to provide a suitable user output.

In some embodiments, the requirement may include a relative consideration such that for example the user misalignment indication is generated in response to a detection of a change in position of the power receiver. Thus, in some embodiments, a user misalignment indication or alert may be generated if the position estimate indicates that the power receiver has (been) moved.

As an example, if the requirement is met, a light or e.g. alert/sound may in initiated to indicate that a misalignment has been detected.

In some embodiments, the user interface may be arranged to provide a user output that provides an indication of a position of the power receiver where the indication is determined in response to the position estimate. The position indication may be an indication of a relative position, such as an indication of a position relative to a preferred or nominal position.

The position indication may in some embodiments be provided as an indication of how the power receiver should be moved towards a preferred position. For example, a display may show an arrow which indicates the direction in which the power receiver should be moved to approach the preferred position. The distance to the preferred position may also be given, e.g. by directly indicating a distance from the current position estimate to the preferred position or e.g. indirectly by adapting a size of the arrow dependent on the distance.

Figure 16:
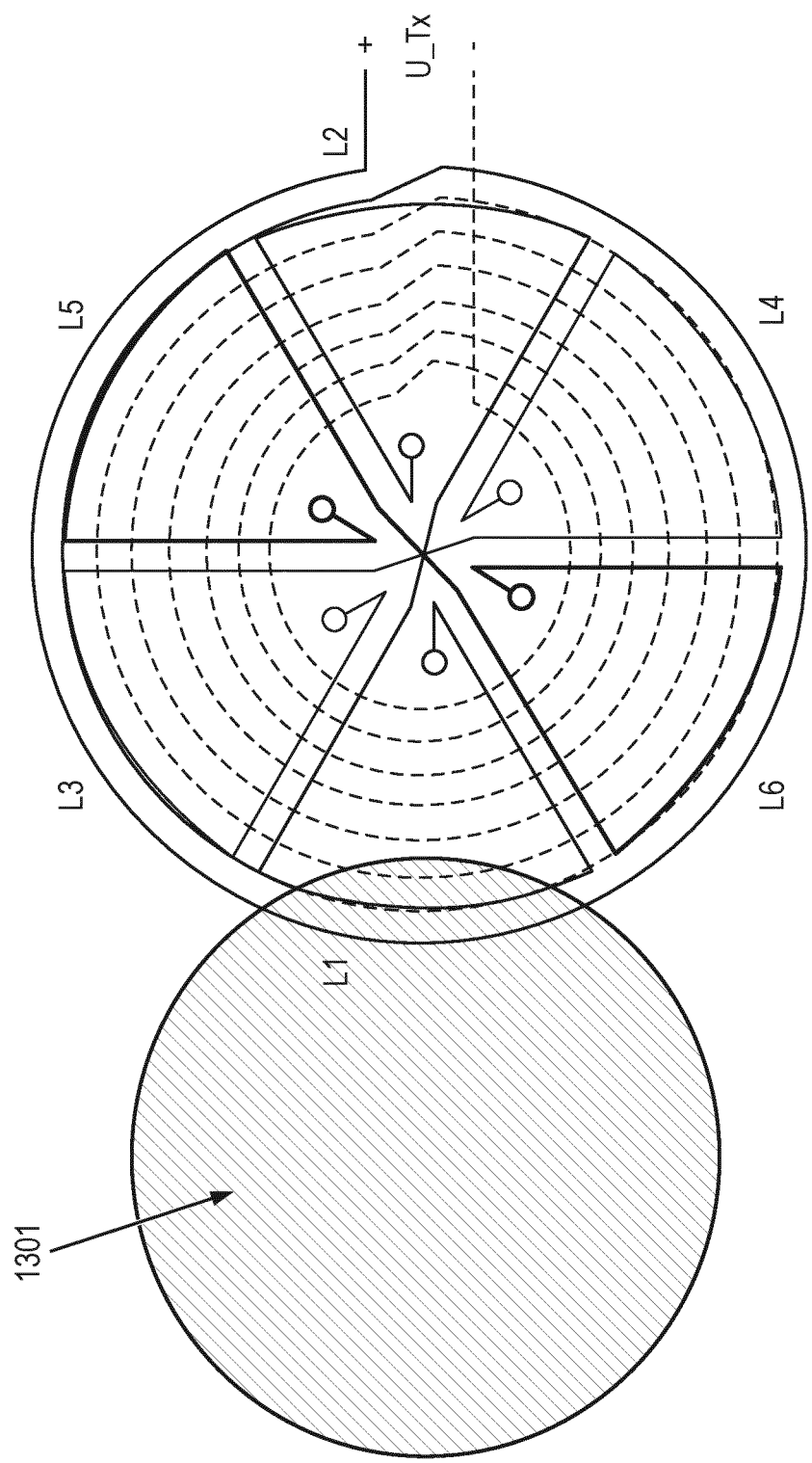
FIG. 16 illustrates an example of a power receiver device and detection coils for a power transmitter in accordance with some embodiments of the invention.

As an example, in FIG. 16 shows a scenario where the power receiver 1301 is misaligned with respect to the transmitter coil and indeed with the misalignment being so extreme that it is unlikely that efficient power transfer is feasible. In the example, the receiver device is too far away and "out of reach" from the active area and a re-calibration procedure may not be initiated. However, the induction balance L1-L2 will be affected by the appliance, induction balances L3-L4 and L5-L6 will be affected as well but much less.

In the example, the estimator 205 may still be used to estimate the position of the power receiver device and this may be used to detect if the appliance is approaching the active area of the power transmitter, and even from which direction it is approaching. This information can be used to guide the power receiver appliance to the center position e.g. by means of a display or by audible means.

In some embodiments, the power transmitter may be arranged to generate a position change indication in response to a detection of a change in the position estimate. The position/change movement indication may be used for different things in different embodiments. In some embodiments, it may as mentioned be used to generate a user indication, such as an audio alarm, indicating to the user that the power receiver appliance has moved and should possibly be moved (by the user) back to a more optimal position for the charging.

In other embodiments, the movement indication may be used to adapt an operating parameter of the power transfer, such as a maximum power transfer level. For example, if a movement is detected, the power level may be constrained to a lower power limit immediately after the detection. The power level may then be gradually increased for the new operating situation while ensuring that the power transfer is reliable and safe (e.g. by ensuring that no foreign objects are detected for an extended period).

In some embodiments, the movement indication may be used to indicate a change of the power control loop. For example, a loop gain, loop filter response, or time constant of the loop may be adapted. For example, during normal operation, the loop performance may have been optimized for the current operating scenario by slowly adapting the loop gain while ensuring loop stability. If the power receiver is moved quickly, the change in coupling factor may result in a substantially changed loop behavior and this may potentially result in potential instability for the current loop parameters. Accordingly, the power controller 203 may when the movement indication is generated change the loop gain to a predetermined and safe value which ensures stability for all coupling factors. The system may then again begin an adaptation of the loop (and specifically the loop gain) to provide e.g. faster loop response while still ensuring stability for the current conditions.

In many embodiments, the power transmitter may comprise an adapter 213 arranged to adapt an operational parameter of the power transfer in response to the position and/or coupling estimate. For example, if the position estimate indicates that the power receiver is too far from a central position, or as previously mentioned if the position estimate indicates a movement, then the maximum power level of the power transfer signal may be reduced, or indeed the power transfer may completely be switched off.

In some embodiments, the adapter 209 may be arranged to adapt the power transfer in response to the position estimate where the adaptation may be an operating parameter of the power transfer, such as a power level, a frequency, a duty cycle, a duration of the power transfer time intervals etc.

For example, if the position estimate indicates that the power receiver has moved this may lead to different operating conditions. The estimator 205 may in this case reduce the power level to ensure safe and reliable operation, and indeed may as a specific case even terminate the power transfer. The power receiver may then proceed to enter an operational mode where full power transfer is gradually achieved by the system gradually adapting to the new operating conditions (e.g., a slow power control operation may be used or a full re-initialization of the power transfer may be performed if the ongoing power transfer was terminated).

In many embodiments, the estimator 205 may be arranged to detect that a change in position has occurred for the power receiver if the measurement signals meet a criterion which includes a requirement that a number of measurement signals that indicate an imbalance which exceeds a second threshold is less than a threshold number which is at least two.

If the induction balance system, and specifically the triple induction balance system of the figures, is properly calibrated before this displacement, this will result in the balanced condition for all three induction balances being affected and a detection voltage is generated for all three induction balances. In this case, a first requirement of the foreign object detection will be met, and thus the initial indication that a foreign object may be present is triggered. However, a second requirement that all three induction balances must not show a substantial imbalance/detection signal is not met. In this case, the first indication is overridden and the estimator 205 does not generate a detection of a foreign object. Thus, a false positive foreign object detection can be avoided.

In some embodiments, the compensator 211 is arranged to initiate an adaption of the compensation in response to the second requirement of the foreign object detection criterion being met. Thus, if an imbalance is detected by more than a threshold number of induction balances, and often if an imbalance is detected for all induction balances, then the compensator 211 may initiate a new adaptation of the compensation. Specifically, new values of the signals (e.g. amplitude and phase of the voltage and/or current) from the different induction balances may be measured and used as the new compensation signals going forward.

As previously described, an imbalance that affects all induction balances is likely to be due to a position change of the power receiver rather than to a foreign object being present. Accordingly, the adaptation of the compensation may allow improved foreign object detection as it can adapt to the new position allowing a more accurate measurement of possible imbalances caused by a foreign object.

Thus, in the approach the foreign object detection criterion includes an evaluation of how many of the measurement signals indicate an imbalance that is higher than a threshold. This assessment may be performed e.g. by the signal amplitude being compared to a threshold with the test being whether the amplitude exceeds the threshold. The requirement may be dependent on which set of balanced detection coils is being evaluated and thus may be different for different sets.

The number of induction balances for which the imbalance exceeds the threshold may be determined and the foreign object detection criterion requires that this number is at least the threshold number, i.e. that at least as many as the threshold number of induction balances indicate an imbalance above the threshold. Only in that case will a foreign object detection be considered to be present, and otherwise it will be considered that there is no foreign object present but that instead the power receiver has moved. In many embodiments, only when the number of imbalances is below a threshold will a foreign object be considered to be detected otherwise it will be considered that power receiver has been moved.

In many embodiments, the threshold number may be no less than three and/or the threshold number may be equal to a number of sets of balanced detection coils in the plurality of sets of balanced detection coils.

E.g. for the example of FIG. 11-16, where the power transmitter comprises three induction balances, the requirement may use a threshold number of three, resulting in e.g. a position change being detected if all of the measurement signals indicate a sufficiently high imbalance.

The approach may provide improved performance in many embodiments and scenarios and may provide an accurate indication of the power receiver being moved.

In many embodiments, particularly efficient operation may be achieved by the threshold number being equal to the number of sets of balanced detection coils. This may provide a more reliable position change detection in some embodiments. It may limit the position change indication to only be activated if objects that are sufficiently large to affect all of the induction balances are present and moved e.g. smaller devices may be considered to be foreign objects.

Similarly, in comparison to using a threshold number of two, the use of a threshold number of three may provide some particular advantages. Specifically, whereas it may be possible or even likely that a foreign object can be positioned such that it will cause an imbalance in two sets of balanced detection coils (e.g. if positioned across the area of two detection coils for different sets of balanced detection coils), it is much less likely that it is possible to position a foreign object such that it will have a strong impact on three sets of balanced detection coils. Indeed, this would typically require the foreign object to extend across three different detection coils which will in many applications be highly unlikely (or even impossible) in view of the necessity for a power receiver to be present in order for power transfer to occur.

The approach may provide a particularly efficient and reliable detection of a movement of the power receiving device. The approach may in embodiments also provide improved foreign object detection. For example, a foreign object detection may rely on at least one of the induction balances indicating an imbalance over a given level and if this is detected it is considered that a foreign object may potentially be present to cause the imbalance. However, this detection may be overridden if it is detected that all measurement signals show a sufficiently high imbalance as this is much more likely to be caused by a movement of the (relatively large) power receiver than a small foreign object (indeed, in many cases the size of the power receiver may render it impossible for a foreign object to be present such that it can affect all induction balances sufficiently).

Thus, in some embodiments, the foreign object detection criterion does not just include a requirement that an imbalance must exceed a threshold but also requires that not all of the induction balances must show an imbalance. In many embodiments, a foreign object detection is not considered to have happened merely because one of the measurement signals indicates a (sufficiently) high imbalance. Rather, in addition, a second requirement which considers the detections signals (or at least some of them) together is required to be met.

In some embodiments, the power transmitter may be arranged to differentiate between imbalances due to a change in position (and thus coupling factor) for the power receiver and due to a foreign object being present in response to an amplitude of the measurement/detection signals. In the described systems, the induction balance(s) can show an imbalance due to an appliance movement/position change or due to a foreign object. In the former case, a large amplitude changes is typically detected (and typically at more than two induction balances) whereas the amplitude changes in the second case are typically much smaller due to foreign objects typically being small compared to the power receiving device (and typically only one or two induction balances are affected). Accordingly, in many embodiments, the position estimate and/or coupling factor (change) estimate is also dependent on the size of the imbalances detected. Specifically, in many embodiments, a position change and/or coupling factor change may be detected (only) if the measurement signal(s) are indicative of an imbalance above a given threshold. Otherwise, it may be considered more likely that the imbalance is due to a foreign object.

In some embodiments, the power transmitter may comprise a receiver which is arranged to receive data from the power receiver. In such embodiments, the power receiver may be arranged to transmit a physical property data to the power transmitter where the physical property data is indicative of one or more physical properties, and specifically extensive physical properties, of the power receiver. For example, the physical property data may be indicative of a size, extension, dimension, etc. of the power receiving device. The physical property data may thus be indicative of a spatial extensive property of the power receiving device. In some embodiments, the physical property data may alternatively or additionally be indicative of a spatial extension or e.g. amount of conductive material (metal) that is part of the power receiving device.

In such embodiments, the physical property data may be fed to the estimator 205 which may be arranged to adapt the position estimate/coupling factor (change) estimation in response to the physical property data. For example, depending on the physical dimension, a function determining the position along an induction balance axis as a function of the measurement signal may be performed. As another example, the selection of a LUT comprising position estimates for difference combinations of measurement signal properties may be made dependent on the received data.

The estimator 205 may estimate a coupling factor (change) estimate for the electromagnetic coupling between the transmitter coil 103 and the receiver coil 107 in response to the signals from the induction balances during the measurement time intervals, and typically specifically in response to the measurement signals. In many embodiments, the estimator 205 may be arranged to determine a relative coupling factor estimate rather than an absolute coupling factor estimate. Specifically, the estimator 205 may be arranged to monitor the measurement signals in order to detect changes in the coupling factor, and if so to estimate how big the change is (and in which direction).

The coupling factor is dependent on the relative position of the receiver coil 107 with respect to the transmitter coil 103 and in many embodiments, the estimator 205 may be arranged to first determine a position of the power receiver relative to the power transmitter and then from this position determine a corresponding coupling factor. For example, the measurement signals may be used to perform a table look up providing a relative position estimate. This relative position estimate may then be used as a look-up to a second look-up table which provides a coupling factor estimate. In other embodiments, the coupling factor may be generated directly without an explicit determination of the position estimate as an explicit value. In such embodiments, the coupling factor may be determined directly by the estimator 205 and the position estimate may not be determined (but can be considered to be an inherent and implicit part of the generation of the coupling factor estimate). For example, the first look-up table may directly output a coupling factor estimate rather than a position estimate which is then used with a second look-up table.

The estimator 205 may provide an indication of the coupling factor estimate to the adapter 213 which may be arranged to adapt a parameter of the power transfer operation in response to the coupling factor estimate. Specifically, the adapter 213 may be arranged to adapt a power loop parameter in response to the coupling factor estimate where the power loop parameter is a loop parameter of the power control loop that adapts the power level of the power transfer signal in response to power control messages received from the power receiver. The power loop parameter may specifically be a loop time constant, a frequency response of a loop filter, and/or a loop gain.

The power control loop performance is heavily dependent on the coupling factor. In general, the loop stability (frequency domain) and settling time (time domain) of the closed loop system is determined by the loop gain and its associated phase margin. In general, for a control loop, the loop parameters such as loop gain and loop filter properties are critical for the performance of the loop and are typically tightly controlled, or indeed are substantially constant in many control loops in order to not only achieve desired performance but also to achieve basic stability of the feedback loop. However, for a power control loop of a wireless power transfer system, the loop parameters and specifically the loop gain, is heavily dependent on the coupling factor. Further, the coupling factor may typically vary by a large amount and unless substantial care is taken, there is a substantial risk of undesirable loop performance or even instability. In the described approach, the coupling factor may be dynamically estimated, and the loop behavior may be adapted accordingly. For example, the loop gain may be adjusted to compensate for gain variations cased by variations in the coupling factor. As another example, the loop filter or a loop delay may be modified to change the phase feedback behavior to avoid 360° feedback resulting in oscillations and instability.

Figure 17:
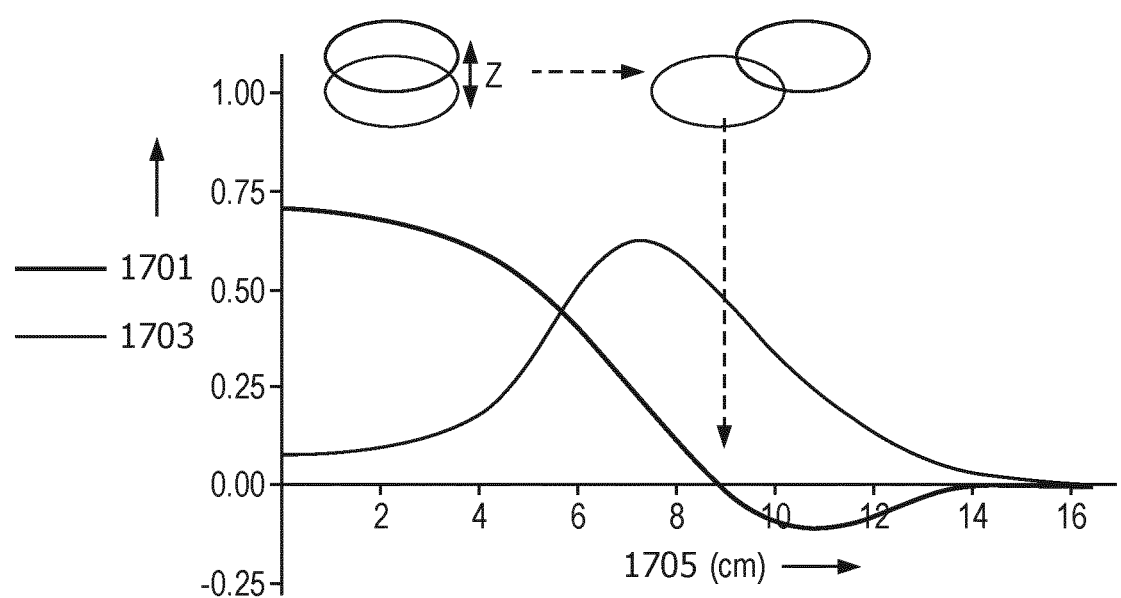
FIG. 17 illustrates an example of a coupling factor and loop gain for a power transfer system as a function of displacement between power transmitter coil and power receiver coil.

As an example, FIG. 17 illustrates the variation in coupling factor, referred to as the K-factor 1701, and loop gain 1703 for different displacements 1705 of the receiver coil 107 and transmitter coil 103. As can be seen, an important parameter that affects the loop gain is the K-factor between the receiver coil 107 and the transmitter coil 103. The K-factor is determined by the size of the coils, Z-distance between the coils, and the misalignment in the plane of the coils. The power transmitter being able to estimate the K-factor allows it to support the power receiver over a larger area and for a larger range of misalignments while still keeping the closed loop stable.

FIG. 17 shows the function of the K-factor & loop gain as a function of misalignment for a given Z distance. If the receiver coil 107 is moved away from the center of the transmitter coil 103, the K-factor reduces to zero and at a certain displacement the K-factor changes sign. On the other hand, the system loop gain first increases as the power receiver is moved away from center because of the resonant behavior of the power transmitter resonant tank that is formed by the transmitter coil 103 and one or more capacitors. However, at a certain displacement, the loop gain drops to zero because the power cannot be transferred anymore due to the lack of coupling. This behavior clearly demonstrates that knowledge about the K-factor may be a substantial assistance in keeping the closed loop stable.

The knowledge of the coupling factor may thus assist in keeping the control loop optimized for loop stability, overshoots and keeping the settling times as desired.

As for the position estimate, the coupling factor estimate may typically be a relative estimate and changes in the coupling factor may be estimated and detected with the loop parameter being adapted accordingly, e.g. by applying a relative change to the gain. Indeed, often the z-direction distance is not known, and the coupling factor may be dependent on this distance. This may prevent an absolute estimate of the coupling factor being determined but may allow a relative change to be detected.

The specific approach for estimating the coupling factor may be different in different embodiments. In many embodiments, measurements may be made during manufacturing with the results stored in the power transmitter in various LUTs for different power receivers. The power transmitter may identify the most suitable LUT (the one most closely matching the power receiver) and use the measurement signals for the table look up to retrieve a coupling factor estimate.

In some embodiments, the estimator 205 may be arranged to determine the coupling factor estimate as a decreasing coupling factor for an increasing amplitude of at least a first of the sets of balanced detection coils. This may reflect that, as indicated by FIG. 17, a larger displacement will tend to result in a lower coupling factor and a larger displacement will tend to result in a larger imbalance and thus in a larger amplitude of the measurement signal for at least one of the induction balances.

In some embodiments, the estimator 205 may be arranged to determine the coupling factor estimate as a decreasing coupling factor for an increasing amplitude difference between at least two of the sets of balanced detection coils.

For example, during manufacturing, measurements may be made to determine a maximum coupling factor for ideal placement of different power receivers or types of power receivers. For example, the measurements may determine the coupling factor for a centrally placed power receiver appliance of a given size. The measurements may be stored in a look-up-table, LUT.

During operation, the estimation circuit 205 may access the LUT and extract a maximum coupling factor value for the current power receiver. It may then estimate an offset in position of the power receiver from the ideal position based on differences in the imbalances of the induction balances. The larger the amplitude difference between induction balances, the more the offset from a central balanced position is the power receiver, and thus the lower the coupling factor. The reduction from the maximum coupling factor provided by the LUT may be calculated using a function determined during manufacture with the function having an increasing reduction for increasing amplitude difference. The reduction may then be applied to the maximum coupling factor to generate the current estimate of the coupling factor.

In more detail, the estimator 205 may for example in some embodiments be arranged to determine the coupling factor using the following procedure, depending on the implementation:

A power receiving appliance is put on the transmitter area and is identified by the power transmitter. The appliance communicates the diameter of its footprint to the power transmitter. Then the power transmitter may address a LUT in order to get the maximum K-factor (coupling coefficient) for a given diameter footprint. This is the case where the receiver coil is put exactly in the center of the power coil. Next, the compensation circuit 211 may compensate the three output signals of the triple induction balances such that the output signal is adjusted to substantially zero. If the three compensation signals are sufficiently similar (e.g. equal or in the same order of magnitude) then this can be considered an indication that that the K-factor provided by the LUT is close to the actual current situation. The control loop can be adjusted based on the K-factor value. However, if the three compensation signals differ much, the appliance is not in the center of the power coil. This means that K-factor provided by the LUT is likely to be inaccurate and specifically that the value provided by the LUT is higher than the actual value. The estimation circuit 205 may accordingly reduce the coupling factor (K-factor) to reflect the differences between the signals. For example, in some embodiments, if the difference in the output signals meets a criterion indicating that the difference is sufficiently high, then a fixed low K-factor value may be provided. In other embodiments, a function may be used to reduce the K-factor value where the function is dependent on the differences between the output signals from the induction balances. The transmitter may then set the initial loop gain parameters to reflect the estimated (and typically reduced) coupling factor, such that overshoot's etc. at the output can be avoided or reduced.

In many embodiments, the coupling factor estimate may be a relative coupling factor estimate such that when a change is detected in the signals from the induction balances it may be converted into a change in the coupling factor estimate. In many embodiments, a change in the signals from the induction balances, such as e.g. an increase in the imbalance, may directly be considered to reflect a change in the coupling factor estimate, such as an indication that a reduction in the coupling factor has occurred. The power transmitter may then quickly modify operation, such as e.g. modify the power control loop, by a relative amount.

In some embodiments, the power transmitter may be arranged to change an operating point of the driver in response to the coupling factor estimate, and may in particular apply a relative change to an operating parameter, such as e.g. a voltage or other parameter of the inverter generating the drive signal, in response to a detection of a relative change of the coupling factor estimate.

In some embodiments, the power transmitter may be arranged to change a frequency of the drive signal in response to the coupling factor estimate, and may in particular apply a relative change to the frequency in response to a detection of a relative change of the coupling factor estimate.

The power transmitter may for example maintain the operating/drive frequency for the power transfer to be within a frequency interval with this frequency interval being dependent on the coupling factor estimate.

As an example, the power transmitter may be arranged to seek to deliver a constant voltage to the output/load. Typically, when the coupling factor changes, the (power) transfer function changes, and changes in the coupling factor estimate may be used to adapt the power transfer parameters to reflect and compensate for such changes in the power transfer function. Specifically, the power transmitter may adapt the duty cycle and/or the frequency based on the coupling factor estimate.

The power transmitter may for example be arranged to determine that a change in the coupling factor estimate has occurred (e.g. an abrupt step change caused by the power receiver suddenly being moved). The power transmitter may then be arranged to determine a corresponding change to the duty cycle and/or frequency of the drive signal, and this change may be applied instantly to the drive signal. The system may then proceed with the power control loop slowly adapting the frequency and/or duty cycle. The initial step change may for example be relatively inaccurate with the power control loop subsequently adapting towards optimal values. However, the initial quick step change based on the coupling factor estimate may provide a much improved transient performance and may substantially reduce e.g. overvoltage or undervoltage conditions.

In many embodiments, the power transmitter may for example comprise a predetermined function or look-up table which has the absolute or relative coupling factor estimate as an input, and which provides an absolute or relative duty-cycle or frequency as an output. The function or look-up-table may for example be determined during a manufacturing or design phase.

The approach and adaptation of operation based on the coupling factor estimate may provide substantially improved performance. Typically, the wireless power transfer system and power transfer function is non-linear and the coupling factor estimate may provide additional information on characteristics and gain of the system.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. The inclusion of a feature in a dependent claim of one independent claim does not imply a limitation to this independent claim but rather indicates that the feature is equally applicable to other independent claims as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. A power transmitter comprising:
a transmitter coil;
a driver circuit,
wherein the driver circuit is arranged to generate a drive signal for the transmitter coil, so as to generate a power transfer signal during at least one power transfer time interval,
wherein the driver circuit is arranged to generate the drive signal for the transmitter coil so as to generate a test signal during at least one measurement time interval;
a plurality of groups of balanced detection coils,
wherein each group of the plurality of groups of balanced detection coils comprises at least two balanced detection coils,
wherein each of the at least two balanced detection coils is arranged such that first signals induced by the transmitter coil compensate each other; and
an estimation circuit,
wherein the estimation circuit is arranged to determine a coupling factor,
wherein the coupling factor is for an electromagnetic coupling between the transmitter coil and a receiver coil in response to a least one first signals from the plurality of groups of balanced detection coils during the at least one measurement time interval,
wherein the estimation circuit is arranged to determine the coupling factor as a decreasing coupling factor for an increasing amplitude of at the least one first signal from at least one of the plurality of groups of balanced detection coils.

2. The power transmitter of claim 1, wherein the coupling factor is a relative coupling factor.

3. A power transmitter comprising:
a transmitter coil;
a driver circuit,
wherein the driver circuit is arranged to generate a drive signal for the transmitter coil, so as to generate a power transfer signal during at least one power transfer time interval,
wherein the driver circuit is arranged to generate the drive signal for the transmitter coil so as to generate a test signal during at least one measurement time interval;
a plurality of groups of balanced detection coils,
wherein each group of the plurality of groups balanced detection coils comprises at least two balanced detection coils,
wherein each of the at least two balanced detection coils is arranged such that first signals induced by the transmitter coil compensate each other;
an estimation circuit,
wherein the estimation circuit is arranged to determine a coupling factor,
wherein the coupling factor is for an electromagnetic coupling between the transmitter coil and a receiver coil in response to a least one first signals from the plurality of groups of balanced detection coils during the at least one measurement time interval,
wherein the estimation circuit is arranged to determine the coupling factor as a decreasing coupling factor for an increasing amplitude of a difference between at least two first signals produced by at least two of the plurality of groups of balanced detection coils.

4. A power transmitter comprising:
a transmitter coil;
a driver circuit,
   wherein the driver circuit is arranged to generate a drive signal for the transmitter coil, so as to generate a power transfer signal during at least one power transfer time interval,
   wherein the driver circuit is arranged to generate the drive signal for the transmitter coil so as to generate a test signal during at least one measurement time interval;
a plurality of groups of balanced detection coils,
   wherein each group of the plurality of groups balanced detection coils comprises at least two balanced detection coils,
   wherein each of the at least two balanced detection coils is arranged such that first signals induced by the transmitter coil compensate each other;
an estimation circuit,
   wherein the estimation circuit is arranged to determine a coupling factor,
   wherein the coupling factor is for an electromagnetic coupling between the transmitter coil and a receiver coil in response to a least one first signals from the plurality of groups of balanced detection coils during the at least one measurement time interval; and
an adapter circuit,
   wherein the adaptor circuit is arranged to adapt a power loop parameter in response to the coupling factor,
   wherein the power loop parameter is a loop parameter of a power control loop,
   wherein the power control loop is arranged to adapt a power level of the power transfer signal in response to power control messages received from a power receiver.

5. The power transmitter of claim 4, wherein the power loop parameter is selected from the group consisting of a loop time constant, a frequency response of a loop filter, and a loop gain.

6. A power transmitter comprising:
a transmitter coil;
a driver circuit,
   wherein the driver circuit is arranged to generate a drive signal for the transmitter coil, so as to generate a power transfer signal during at least one power transfer time interval,
   wherein the driver circuit is arranged to generate the drive signal for the transmitter coil so as to generate a test signal during at least one measurement time interval;
a plurality of groups of balanced detection coils,
   wherein each group of the plurality of groups of balanced detection coils comprises at least two balanced detection coils,
   wherein each of the at least two balanced detection coils is arranged such that first signals induced by the transmitter coil compensate each other; and
an estimation circuit,
   wherein the estimation circuit is arranged to determine a coupling factor,
   wherein the coupling factor is for an electromagnetic coupling between the transmitter coil and a receiver coil in response to a least one first signals from the plurality of groups of balanced detection coils during the at least one measurement time interval,
   wherein the estimation circuit is arranged to determine a position estimate for a power receiver in response to at least one first signals from the plurality of groups of balanced detection coils during the at least one measurement time interval; and
an adapter circuit, wherein the adaptor circuit is arranged to adapt an operational parameter of the power transfer in response to the position estimate.

7. The power transmitter of claim 6, further comprising a user interface, wherein the user interface is arranged to provide an indication of misalignment of a power receiver in response to the position estimate meeting a requirement.

8. The power transmitter of claim 6,
wherein the adapter circuit is arranged to adapt a power loop parameter in response to the position estimate,
wherein the power loop parameter is a loop parameter of a power control loop,
wherein the power control loop is arranged to adapt a power level of the power transfer signal in response to power control messages received from a power receiver.

9. The power transmitter of claim 6,
wherein the estimation circuit is arranged to detect a position change of a power receiver if the first signals meet a criterion,
wherein the criterion comprises a requirement that at least one first signals indicates an imbalance between a portion of the first signals induced in at least two detection coils of the plurality of groups of balanced detection coils,
wherein a number of groups of balanced detection coils with the imbalance exceeding a second threshold is less than a threshold number.

10. The power transmitter of claim 6, further comprising a compensator circuit,
wherein the compensator circuit is arranged to compensate the at least one first signal when no foreign object is present,
wherein the compensator circuit is arranged to determine the coupling factor in response to an amount of compensation.

11. The power transmitter of claim 10,
wherein the compensator circuit is arranged to determine a static component and a dynamic component of the compensation,
wherein the static component is independent of a presence of a power receiver,
wherein the dynamic component is dependent on the presence of the power receiver,
wherein the compensator circuit is arranged to determine the position estimate in response to the dynamic component.

12. A method comprising:
generating a power transfer signal during at least one power transfer time interval;
generating a test signal during at least one measurement time interval; and
determining a coupling factor for an electromagnetic coupling between a transmitter coil and a receiver coil in response to first signals during the at least one measurement time interval, wherein the first signals are induced signals from at least one of a plurality of groups of balanced detection coils,
wherein the determining of at least one of the plurality of groups of balanced detection coils is an increasing amplitude.

13. The method of claim 12,
wherein the each of the plurality of groups of balanced detection coils comprises at least two coils,
wherein the at least two coils are arranged so to a compensate for a portion of any induced signal.

14. The method of claim 12, wherein the coupling factor is a relative coupling factor.

15. A method comprising:
generating a power transfer signal during at least one power transfer time interval;
generating a test signal during at least one measurement time interval; and
determining a coupling factor for an electromagnetic coupling between a transmitter coil and a receiver coil in response to first signals during the at least one measurement time interval, wherein the first signals are induced signals from at least one of a plurality of groups of balanced detection coils,
wherein the determining is between at least two of the plurality of groups of balanced detection coils as a decreasing coupling factor for an increasing amplitude difference.

16. A method comprising:
generating a power transfer signal during at least one power transfer time interval;
generating a test signal during at least one measurement time interval;
determining a coupling factor for an electromagnetic coupling between a transmitter coil and a receiver coil in response to first signals during the at least one measurement time interval, wherein the first signals are induced signals from at least one of a plurality of groups of balanced detection coils; and
adapting a power loop parameter in response to the coupling factor,
wherein the power loop parameter is a loop parameter of a power control loop,
wherein the power control loop is arranged to adapt a power level of the power transfer signal in response to power control messages received from a power receiver.

17. A computer program stored on a non-transitory medium, wherein the computer program when executed on a processor performs the method as claimed in claim 12.

18. A method comprising:
generating a power transfer signal during at least one power transfer time interval;
generating a test signal during at least one measurement time interval;
determining a coupling factor for an electromagnetic coupling between a transmitter coil and a receiver coil in response to first signals during the at least one measurement time interval, wherein the first signals are induced signals from at least one of a plurality of groups of balanced detection coils;
determining a position estimate for a power receiver in response to at least one first signals from the plurality of groups of balanced detection coils during the at least one measurement time interval; and
changing an operational parameter of the power transfer in response to the position estimate.

19. The method of claim 18, further comprising:
changing a power loop parameter in response to the position estimate, wherein the power loop parameter is a loop parameter of a power control loop; and
changing a power level of the power transfer signal in response to power control messages received from a power receiver.

20. The method of claim 15, further comprising detecting a position change of a power receiver if the first signals meet a criterion,
wherein the criterion comprises a requirement that at least one first signals indicates an imbalance between a portion of the first signals induced in at least two detection coils of the plurality of groups of balanced detection coils,
wherein a number of groups of balanced detection coils with the imbalance exceeding a second threshold is less than a threshold number.

21. The method of claim 18, further comprising:
compensating the at least one first signal when no foreign object is present; and
determining the coupling factor in response to an amount of compensation.

22. The method of claim 21, further comprising:
determining a static component and a dynamic component of the compensation,
wherein the static component is independent of a presence of a power receiver,
wherein the dynamic component is dependent on the presence of the power receiver; and
determining the position estimate in response to the dynamic component.

* * * * *